United States Patent
Tian et al.

(10) Patent No.: US 12,230,836 B2
(45) Date of Patent: Feb. 18, 2025

(54) ORGANIC-INORGANIC HYBRID COMPLEX AND COATING COMPOSITION COMPRISING SAME, SEPARATOR, SECONDARY BATTERY, BATTERY MODULE, BATTERY PACK AND POWER CONSUMING DEVICE

(71) Applicant: CONTEMPORARY AMPEREX TECHNOLOGY (HONG KONG) LIMITED, Hong Kong (CN)

(72) Inventors: Jiarui Tian, Ningde (CN); Yongsheng Guo, Ningde (CN); Cong Cheng, Ningde (CN); Yuanyuan Lan, Ningde (CN); Shuojian Su, Ningde (CN); Xinxin Zhang, Ningde (CN); Na Liu, Ningde (CN); Chuying Ouyang, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 229 days.

(21) Appl. No.: 17/967,844

(22) Filed: Oct. 17, 2022

(65) Prior Publication Data
US 2023/0049880 A1 Feb. 16, 2023

Related U.S. Application Data

(63) Continuation of application No. PCT/CN2021/103405, filed on Jun. 30, 2021.

(51) Int. Cl.
*H01M 50/449* (2021.01)
*H01M 50/411* (2021.01)
*H01M 50/431* (2021.01)

(52) U.S. Cl.
CPC ....... *H01M 50/449* (2021.01); *H01M 50/411* (2021.01); *H01M 50/431* (2021.01)

(58) Field of Classification Search
None
See application file for complete search history.

(56) References Cited

U.S. PATENT DOCUMENTS

| 2020/0220136 A1 | 7/2020 | Wang et al. |
| 2020/0220219 A1 | 7/2020 | Wang et al. |

FOREIGN PATENT DOCUMENTS

| CN | 109505035 A | 3/2019 |
| CN | 111052477 A | 4/2020 |
| CN | 112352334 A | 2/2021 |
| JP | 2011505696 A | 2/2011 |
| JP | 2012518032 A | 8/2012 |
| JP | 2020507191 A | 3/2020 |

OTHER PUBLICATIONS

Shearer, G.C., Chavan, S., Bordiga, S., Svelle, S., Olsbye, U., Lillerud, K.P.—Defect Engineering: Tuning the Porosity and Composition of the Metal-Organic Framework UiO-66 via Modulated Synthesis, Chem. Mater., 2016, pp. 3749-3761 (Year: 2016).*
Aluminum hydroxide oxide, available online at https://en.wikipedia.org/wiki/Aluminium_hydroxide_oxide, date unknown.*
Japan Patent Office (JPO) Decision to Grant a Patent For JP Application No. 2022-562821 Apr. 30, 2024 7 Pages (including translation).
The Japan Patent Office (JPO) Notification of Reasons for Refusal for Application No. 2022-562821 Dec. 5, 2023 9 Pages(including translation).
The World Intellectual Property Organization (WIPO) International Search Report and Written Opinion for PCT/CN2021/103405 Mar. 28, 2022 16 pages (Including English translation).
The European Patent Office (EPO) Extended Search Report for EP Application No. 21935433.9 Jun. 5, 2023 5 Pages.

* cited by examiner

*Primary Examiner* — Anca Eoff
(74) *Attorney, Agent, or Firm* — ANOVA LAW GROUP, PLLC

(57) ABSTRACT

The present application provides an organic-inorganic hybrid complex which can be used in a coating of a separator for a secondary battery, wherein the organic-inorganic hybrid complex is formed from basic units represented by formula (I) being periodically assembled in at least one spatial direction: $[L_{x-i\square i}][M_aC_b]\cdot A_z$ (I), wherein a defect percentage expressed in $i/x*100\%$ is 1% to 30%. The present application further provides a coating composition comprising the organic-inorganic hybrid complex, a coating formed from the coating composition, a separator comprising the coating for a secondary battery, a secondary battery comprising the separator, a battery module, a battery pack and a device. By applying the organic-inorganic hybrid complex of the present application in a coating, the electrolyte infiltration of a separator for a secondary battery is improved while increasing the electrolyte retention rate, thereby improving the rate capability and cycling life of the secondary battery.

19 Claims, 6 Drawing Sheets

ORGANIC-INORGANIC HYBRID COMPLEX AND COATING COMPOSITION COMPRISING SAME, SEPARATOR, SECONDARY BATTERY, BATTERY MODULE, BATTERY PACK AND POWER CONSUMING DEVICE

CROSS-REFERENCE TO RELATED APPLICATION

This application is a continuation application of PCT Patent Application No. PCT/CN2021/103405, entitled "ORGANIC-INORGANIC HYBRID COMPLEX AND COATING COMPOSITION COMPRISING SAME, SEPARATOR, SECONDARY BATTERY, BATTERY MODULE, BATTERY PACK AND POWER CONSUMING DEVICE" filed on Jun. 30, 2021, which is incorporated herein by reference in its entirety.

TECHNICAL FIELD

The present application relates to the technical field of secondary batteries, and in particular relates to an organic-inorganic hybrid complex which can be used to form a coating of a separator for a secondary battery, a coating composition comprising the complex, a coating formed from the coating composition, a separator comprising the coating for a secondary battery and a secondary battery comprising the separator, a battery module, a battery pack and a power consuming device.

BACKGROUND

Lithium ion secondary batteries have the advantages of high energy density, long cycling life and no memory effect and are thus widely used in many consumer electronic products. In recent years, with the continuous development of electric vehicles and energy storage systems, the requirement for the energy density of lithium ion secondary batteries are also increasing.

A secondary battery, refers to a battery which can continue to be used by activating the active material by means of charging after the battery is discharged. Typically, a secondary battery comprises a positive electrode plate, a negative electrode plate, a separator, an electrolyte, and a solvent. During the charging/discharging process of the battery, active ions are intercalated and de-intercalated back and forth between the positive electrode plate and the negative electrode plate. The separator is provided between the positive electrode plate and the negative electrode plate. A separator is an important part of a lithium ion battery, and is usually from a polymer functional material with nano-scale micropores. The main function of the separator is to prevent the two electrodes from contacting each other thereby causing a short circuit, while allowing electrolyte ions to pass therethrough. Specifically, the separator can insulate electrons, prevent internal short circuits, and at the same time allow active ions to pass therethrough and move between the positive and negative electrodes. The performance of the separator determines the interface structure and internal resistance of the battery, which directly affects the capacity, cycling and safety performance of the battery.

At present, most of the commercialized lithium ion battery separator products comprise polyolefin materials, especially microporous polyolefin films, including polyethylene (PE) monolayer films, polypropylene (PP) monolayer films, and microporous PP/PE/PP multilayer films formed from PP and PE. These microporous polyolefin films generally have poor infiltration by electrolyte, which leads to difficulty in electrolyte injection during the production, and increases polarization, thus reducing the power density and cycling life of the battery.

Ion conducting coatings such as ceramic coatings have been used in the prior art to improve the infiltration. However, the preparation of these coatings requires calcination, and has a cumbersome and complex process, and a limited effect, especially in terms of improving the infiltration, thus resulting in insufficient improvements in the rate performance and cycling life of the batteries. In addition, high-temperature resistant metal-organic framework (MOF) materials have also been used as a main coating material to improve the infiltration. However, when the MOF material coating is used to improve the infiltration of a separator, the improvement only depends on the increase in porosity of the separator, i.e., the increase in the specific surface area, and the contribution from the material itself is actually very small, so the infiltration of the separator having an MOF material coating still needs to be improved.

SUMMARY OF THE INVENTION

In view of the problems mentioned in the background art, an object of the present application is to provide a coating material for a secondary battery separator, wherein the coating material has the effect of improving the electrolyte infiltration and can also increase the electrolyte retention rate, thereby reducing polarization, improving the power density of the secondary battery, and increasing the cycle life.

In order to achieve the above object, in a first aspect, the present application provides an organic-inorganic hybrid complex, formed from basic units represented by formula (I) being periodically assembled in at least one spatial direction.

wherein in the formula (I), M represents a metal element of the first transition series, C represents an atom, atomic group, or anion which can optionally form a metal cluster with M, L represents an organic ligand, particularly an organic bridging ligand which can form a coordination bond with the metal M or metal cluster $M_aC_b$, $\square$ represents a ligand defect, A represents an atom or cation capable of being intercalated and de-intercalated, x can be a number of 1-4, more optionally can be a number of 1-3, a can be a number of greater than 0 and less than or equal to 4, more optionally a number of 1-4, and z can be a number of 0-2, more optionally a number of 0-1. In the formula (I), the following relationships can be satisfied: $0<i<x$ and $0 \leq b:a \leq 1$.

In the present application, a defect level of the organic-inorganic hybrid complex of the present application with respect to the ideal defect-free crystal structure is represented by a defect percentage of $i/x*100\%$. The defect percentage can be about 1% to about 30%.

In one embodiment, the defect percentage can be about 2% to about 20%. In one embodiment, the defect percentage can be about 2.5% to about 18%. In one embodiment, the defect percentage can be about 5% to about 10%.

In one embodiment, in the formula (I), the following relationship can be satisfied: $½ \leq x:a \leq 3$.

In one embodiment, in the formula (I), the ratio of a to b can satisfy $¼ \leq b:a \leq 1$.

In one embodiment, the M can be selected from one or more of Sc, Ti, V, Cr, Mn, Fe, Co, Ni, Cu and Zn. More optionally, the M can be selected from one or more of Mn, Fe, Co, Cu and Zn.

In one embodiment, the C can be selected from one or more of —O—, =O, $O^{2-}$, $S^{2-}$, $F^-$, $Cl^-$, $Br^-$, $I^-$, CO, —OH and $OH^-$. More optionally, the C can be —O— or —OH.

In one embodiment, the organic bridging ligand L can be selected from at least one of cyano, benzimidazole ligands, porphyrin ligands, pyridine ligands, pyrazole ligands, pyrimidine ligands, piperidine ligands, pyrrolidine ligands, furan ligands, thiophene ligands, pyrazine ligands, piperazine ligands, pyridazine ligands, triazine ligands, tetrazine ligands, indole ligands, quinoline ligands, carbazole ligands, morpholine ligands and polycarboxylic acid ligands. One or more hydrogen atoms in the organic bridging ligand L is/are optionally substituted by one or more substituents, each of which can be independently selected from at least one of cyano, nitro, amino, an aldehyde group, carboxyl, a halogen, C1-C6 alkyl, C1-C6 hydroxyalkyl, C1-C6 alkoxy, C2-C6 alkenyl, C2-C6 alkynyl, C3-C8 cycloalkyl, C6-C10 aryl, C6-C10 heteroaryl and any combination thereof. In one embodiment, the organic bridging ligand L can be selected from at least one of cyano, benzimidazole ligands and polycarboxylic acid ligands. In one embodiment, the organic bridging ligand L can be selected from at least one of cyano, benzimidazole ligands, trimesic acid ligands and terephthalic acid ligands. In one embodiment, the organic bridging ligand L can be selected from at least one of cyano, a 5-chlorobenzimidazole ligand (cbIm), a trimesic acid ligand (BTC), a terephthalic acid ligand (BDC) and a tris(2-benzimidazolylmethyl)amine ligand (NTB).

In one embodiment, the A can be an atom or cation of one or more metal elements selected form Li, Na, K, Rb, Cs, Sr, Zn, Mg and Ca. More optionally, the A can be Li or Na.

In one embodiment, in the organic-inorganic hybrid complex of the present application, the basic units represented by formula (I) can be periodically assembled in at least one of three spatial directions X', Y' and Z', wherein the three spatial directions X', Y' and Z' in each case form an angle of 0-75 degree, optionally 5-60 degree, with the X, Y and Z directions in the cartesian coordinate system.

In one embodiment, the basic units represented by formula (I) can be periodically assembled in at least one spatial direction of the X, Y and Z directions in the cartesian coordinate system.

In one embodiment, in the organic-inorganic hybrid complex of the present application, the number of the basic units represented by formula (I) periodically assembled in at least one spatial direction can be about 3 to about 10,000.

In another aspect, the present application further provides a coating composition for a secondary battery separator, wherein the coating composition can comprise the organic-inorganic hybrid complex of the present application as described above.

In one embodiment, in the coating composition of the present application, the content of the organic-inorganic hybrid complex can be about 12 wt % to about 90 wt % based on the total weight of the coating composition. In one embodiment, the content of the organic-inorganic hybrid complex can be about 17 wt % to about 85 wt % based on the total weight of the coating composition. In one embodiment, the content of the organic-inorganic hybrid complex can be about 34 wt % to about 68 wt % based on the total weight of the coating composition.

In one embodiment, optionally, the coating composition of the present application can further comprise inorganic particles.

In one embodiment, where the coating composition of the present application comprises inorganic particles, the mass percentage of the organic-inorganic hybrid complex can be about 15 wt % to about 85 wt % based on the total mass of the organic-inorganic hybrid complex and the inorganic particles in the coating composition. In one embodiment, the mass percentage of the organic-inorganic hybrid complex can be about 20 wt % to about 80 wt % based on the total mass of the organic-inorganic hybrid complex and the inorganic particles in the coating composition. In one embodiment, the mass percentage of the organic-inorganic hybrid complex can be about 40 wt % to about 80 wt % based on the total mass of the organic-inorganic hybrid complex and the inorganic particles in the coating composition.

In one embodiment, where the coating composition of the present application comprises inorganic particles, the inorganic particles can be selected from boehmite, zeolite, molecular sieves, alumina, aluminum oxyhydroxide, silica, aluminum nitride, silicon carbide, magnesia, calcium oxide, zinc oxide, zirconia, titanium oxide and mixtures thereof.

In another aspect, the present application further provides a separator for a secondary battery. The separator for a secondary battery of the present application can comprises a polymer substrate layer and a coating coated onto the substrate layer, wherein the coating can comprise the organic-inorganic hybrid complex of the present application as described above or the coating composition of the present application as described above.

In another aspect, the present application further provides a secondary battery. The secondary battery of the present application can comprise a positive electrode, a negative electrode, an electrolyte and a separator for a secondary battery of the present application as described above.

In another aspect, the present application further provides a battery module. The battery module of the present application can comprise a secondary battery of the present application as described above.

In another aspect, the present application further provides a battery pack. The battery pack of the present application can comprise a battery module of the present application as described above.

In another aspect, the present application further provides a power consuming device. The power consuming device of the present application can comprise a secondary battery of the present application as described above, or a battery module of the present application as described above, or a battery pack of the present application as described above, or a combination thereof.

In the secondary battery of the present application, by using the organic-inorganic hybrid complex of the present application in a coating of the separator, the electrolyte infiltration of the separator is significantly improved and the electrolyte retention rate is greatly increased, such that the polarization is reduced and finally the power density and cycle life of the secondary battery are significantly improved.

LIST OF REFERENCE NUMERALS

Figure 1:
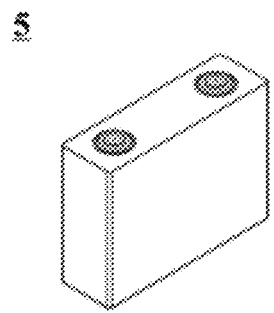
FIG. 1 is a schematic diagram of a secondary battery according to an embodiment of the present application.

1 Battery pack
2 Upper box body
3 Lower box body
4 Battery module
5 Secondary battery
51 Housing
52 Electrode assembly
53 Top cover assembly

DETAILED DESCRIPTION OF EMBODIMENTS

In order to make the objectives, technical solutions and advantages of the present application clearer, the embodiments of the application will be described in detail below with reference to the accompanying drawings. However, those of ordinary skill in the art should understand that these embodiments are only used to illustrate the technical solutions of the present application, instead of being limiting.

For the sake of brevity, some numerical ranges are explicitly disclosed herein. However, any lower limit may be combined with any upper limit to form a range that is not explicitly described; and any lower limit may be combined with any other lower limit to form a range that is not explicitly described, and any upper limit likewise may be combined with any other upper limit to form a range that is not explicitly described. Furthermore, each individually disclosed point or single value itself may serve as a lower or upper limit in combination with any other point or single value or with other lower or upper limit to form a range that is not explicitly described.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, preferably sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), steps (a), (c) and (b), and also steps (c), (a) and (b), etc.

The terms "comprise" and "include" mentioned in the present application are open-ended or closed-ended, unless otherwise stated. For example, "comprise" and "include" may mean that other components not listed may further be comprised or included, or only the listed components may be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or exist).

In one aspect, the present application provides an organic-inorganic hybrid complex. The organic-inorganic hybrid complex of the present application can be formed from basic units represented by formula (I) being periodically assembled in at least one spatial direction.

In the formula (I), the M can represent a metal element of the first transition series. The metal element of the first transition series are chemically active, and has a stable low oxidation valence state (+1 to +4), a relatively large electronegativity, and strong coordination ability. This facilitates the formation of a coordination bond between the metal element of the first transition series and an organic ligand (may also be referred as an organic matter ligand), or the formation of a metal cluster and then a coordination bond with a common organic ligand, avoiding the occurrence of a high element valence state of +5 to +7, which in turn leads to too many coordination bonds required in the space near the metal atom. Moreover, the smaller steric hindrance effect of the metal element of the first transition series will make the formation of a stable coordination structure easier, and will not form metal-metal bonds as easily as the metal element of the second and third transition series, thus affecting the coordinate bond stability.

Optionally, M can be selected from one or more of Sc, Ti, V, Cr, Mn, Fe, Co, Ni, Cu and Zn. More optionally, the M can be selected from one or more of Mn, Fe, Co, Cu and Zn.

In the formula (I), C represents an atom, atomic group, or anion which can optionally form a metal cluster with M. Optionally, the C can be selected from one or more of —O—, =O, $O^{2-}$, $S^{2-}$, $F^-$, $Cl^-$, $Br^-$, $I^-$, CO, —OH and $OH^-$. More optionally, the C can be —O— or —OH.

In the formula (I), L represents an organic ligand, particularly an organic bridging ligand, which can form a coordination bond with the metal M or metal cluster $M_aC_b$. Although the mechanism has not yet been fully understood, it is speculated that the organic bridging ligand can effectively provide a metal-ligand complete frame required to receive a certain proportion of defect sites compared to a monodentate ligand (i.e., a ligand containing one coordinating atom). This complete frame structure can fully achieve the effect of improving the infiltration of the coating of the separator while maintaining the structural stability of the organic-inorganic hybrid complex.

As non-limiting examples, the organic bridging ligand L can comprise cyano (CN), benzimidazole ligands, porphyrin ligands, pyridine ligands, pyrazole ligands, pyrimidine ligands, piperidine ligands, pyrrolidine ligands, furan ligands, thiophene ligands, pyrazine ligands, piperazine ligands, pyridazine ligands, triazine ligands, tetrazine ligands, indole ligands, quinoline ligands, carbazole ligands, morpholine ligands and polycarboxylic acid ligands. One or more hydrogen atoms in the organic bridging ligand L is/are optionally substituted by one or more substituents, which can be independently selected from cyano, nitro, amino, an aldehyde group, carboxyl, a halogen, C1-C6 alkyl, C1-C6 hydroxyalkyl, C1-C6 alkoxy, C2-C6 alkenyl, C2-C6 alkynyl, C3-C8 cycloalkyl, C6-C10 aryl, C6-C10 heteroaryl and any combination thereof.

As non-limiting examples, the benzimidazole ligands may include a benzimidazole ligand (bIm), a 5-chlorobenzimidazole ligand (cbIm), a 5-nitrobenzimidazole ligand (nbIm), a 2-methyl-5-chlorobenzimidazole ligand, a tris(2-benzimidazolylmethyl)amine ligand (NTB), etc. The imidazole ligands may include an imidazole ligand (IM), 2-a methylimidazole ligand (mIM), a 2-nitroimidazole ligand (nIM), etc. The pyrimidine ligands may include a 2-hydroxy-5-fluoropyrimidine ligand (F-pymo). The triazine ligands may include a 2,4,6-trimercapto-s-triazine ligand (TATB). The tetrazine ligands may include a 3,6-di-4-pyridyl-1,2,4,5-tetrazine ligand (DPT). The polycarboxylic acid ligands may include a pyromellitic acid ligand (BTEC), a trimesic acid ligand (BTC), a terephthalic acid ligand (BDC), a 2,6-naphthalenedicarboxylic acid ligand (NDC), a 1,4-phenylenediacetic acid ligand (PDA), a 2,3-pyrazine dicarboxylic acid ligand (PZDC), a 2,2-bis(4-carboxyphenyl) hexafluoropropane ligand (H2hfipbb), a 1,4,5,8-naphthalenetetracarboxylic acid ligand (NTC), a 5-tert-butyl-1,3-phthalic acid ligand (TPIC), a biphenyltetracarboxylic acid ligand (BPTC), a 9,10-anthracene dicarboxylic acid ligand (ADC), a 4-aminophenyltetrazoic acid ligand (APT), a 2,4,6-pyridinetricarboxylic acid ligand (PYTA), a 4,4',4''-benzene-1,3,5-triyl-tri-benzoic acid ligand (BTB), a pyridinedicarboxylic acid ligand (PDC), a 2,3-pyrazine-tetrazolic acid ligand (DTP), a glutaric acid ligand (GLA), etc.

In one embodiment, the organic bridging ligand L can be selected from cyano, benzimidazole ligands and polycarboxylic acid ligands. In one embodiment, the organic bridging ligand L can be selected from cyano, benzimidazole ligands, trimesic acid ligands and terephthalic acid ligands. In one embodiment, the organic bridging ligand L can be selected from cyano, a 5-chlorobenzimidazole ligand (cbIm), a trimesic acid ligand (BTC), a terephthalic acid ligand (BDC) and a tris(2-benzimidazolylmethyl)amine ligand (NTB).

Among them, these polycarboxylic acid ligands in the present application are complexed with the central atom metal, and can have at least one hydrogen removed, and may function as a Lewis base in the complex.

In the formula (I), □ represents a ligand defect (i.e., a lattice vacancy). In the organic-inorganic hybrid complex of the present application, the defect is caused by the removal of the ligand alone, or by the removal of both the ligand and one or more metal or metal cluster atoms connected thereto. Although the mechanism is not fully understood, it is speculated that in the organic-inorganic hybrid complexes of the present application, the defects in the periodically assembled three-dimensional structure can provide exposed sites for organic ligands, which all have a polar group that can form intermolecular hydrogen bonds with the solvent molecules of the electrolyte. Therefore, when the organic-inorganic hybrid complex of the present application is applied to the coating of a separator, the electrolyte infiltration of the coated separator can be improved. Moreover, since the ligand defects are uniformly distributed in the organic-inorganic hybrid complex structure, the organic-inorganic hybrid complex of the present application can more effectively improve the electrolyte infiltration of the separator while increasing the electrolyte retention rate, so as to reduce the internal polarization of the cell, improve the power density of the battery, and increase the cycle life.

In the formula (I), A represents an atom or cation capable of being intercalated and de-intercalated. Optionally, the A can be selected from an atom or cation of one or more metal elements of Li, Na, K, Rb, Cs, Sr, Zn, Mg and Ca. More optionally, the A represent Li or Na.

In the formula (I), the numerical value of each of x, i, z, a, and b is not limited. In one embodiment, x can be a number of 1-4. More optionally, x can be a number of 1-3. In one embodiment, a can be a number of greater than 0 and less than or equal to 4. More optionally, a can be a number of 1-4. In one embodiment, b can be a number of greater than or equal to 0 and less than or equal to 4. More optionally, b can be a number of 1-4. In one embodiment, z can be a number of 0-2. More optionally, z can be a number of 0-1.

In the formula (I), the following relationship can be satisfied: $0 \leq i < x$. In the corresponding defect-free organic-inorganic hybrid complex, i=0. The corresponding chemical formula is $L_x[M_aC_b] \cdot A_z$.

In the present application, the value of i in formula (I) can be determined by the following method. Specifically, the theoretical formula $L_x[M_aC_b] \cdot A_z$ of a defect-free product corresponding to the organic-inorganic hybrid complex of the present application can be determined by known methods, such as X-ray diffraction analysis (XRD), in-situ cold field emission gun double spherical aberration corrected transmission electron microscopy (STEM), etc. The above theoretical formula may also be known to those skilled in the art. In addition, according to the measured element ratio of the organic-inorganic hybrid complex, the experimental formula $L_{x'}[M_aC_b] \cdot A_z$ of the basic unit in the complex can be obtained. The above element ratio can be determined by a measurement method known in the art, such as inductively coupled plasma emission spectrometry (ICP), a carbon-sulfur elemental analyzer, elemental quantitative analysis (EA), etc. Finally, by means of the comparison between the experimental formula $L_{x'}[M_aC_b] \cdot A_z$ and the corresponding theoretical formula $L_x[M_aC_b] \cdot A_z$ of the defect-free product, the value of i can be obtained, thereby determining the defect percentage i/x*100% which represents the defect level of the organic-inorganic hybrid complex of the present application relative to the ideal defect-free crystal structure. Specifically, the defect percentage is =(x−x')/x*100%.

For illustrative purposes only, the determination of the theoretical formula for the corresponding defect-free product is described in more detail. Theoretically, when all metal elements and ligand species have been identified, the element ratio in the organic-inorganic hybrid complex will only depend on the valence of the metal element having an absolute dominant percentage in the complex, and the coordination number of the corresponding ligand. For example, if there is only one type of M as a metal element in the organic-inorganic hybrid complex, as determined by X-ray photoelectron spectroscopy (XPS), electron energy loss spectroscopy (EELS), etc., the valence of M having an absolutely dominant percentage is $+a_1$, the coordination number of the ligand L is $a_2$, the theoretical chemical formula of the organic-inorganic hybrid complex can be $L_{a1}M_{a2}$ without forming a metal cluster. If the organic-inorganic hybrid complex has an atom or cation A that does not participate in the formation of the molecular framework, that is, can be intercalated and de-intercalated, and the valence of the A is $+a_3$, the theoretical chemical formula of the organic-inorganic hybrid complex can be $L_{a1}M_{a2-a3/a1*z} \cdot A_z$ without forming a metal cluster. Where a metal cluster is formed, for example, the existence form of the metal cluster can be investigated by means of in-situ cold field emission gun double spherical aberration corrected transmission electron microscopy (STEM) and other characterization methods that can analyze the molecular structure, and then the valency of the metal cluster is substituted for balancing. Finally, the theoretical formula $L_x[M_aC_b] \cdot A_z$ of the defect-free product corresponding to the organic-inorganic hybrid complex of the present application can be determined, wherein the subscript numbers a and b can be converted to integers as required.

In the organic-inorganic hybrid complex of the present application, the defect percentage can be about 1% to about 30%. The defect percentage is optionally not lower than about 2%, more optionally not lower than 3%, more optionally not lower than about 4%, more optionally not lower than about 5%, more optionally not lower than about 6%, more optionally not lower than about 7%, and more optionally not lower than about 8%. In addition, the defect percentage is optionally not higher than about 27.5%, more optionally not higher than about 25%, more optionally not higher than about 22.5%, more optionally not higher than 20%, more optionally not higher than about 17.5%, more optionally not higher than about 15%, more optionally not higher than about 12.5%, and more optionally not higher than about 10%. In one embodiment, the defect percentage can be about 2% to about 20%. In one embodiment, the defect percentage can be about 5% to about 10%.

In the formula (I), the following relationships can be satisfied: $\frac{1}{2} \leq x:a \leq 3$. For clarity, x:a represents the ratio of the ligand and defect to the metal atom. When M is cations of two or more metal elements, a represents the number of all metal cations in a single basic unit represented by formula I.

In the formula (I), the following relationship can be satisfied: $0 \leq b:a \leq 1$. Where a metal cluster $M_aC_b$ is formed, the ratio of a to b can satisfy $\frac{1}{4} \leq b:a \leq 1$.

In the organic-inorganic hybrid complex of the present application, by applying the defect percentage within the range as described above, sufficient ligand defect sites (i.e., ligand-exposing sites) can be provided for the organic-inorganic hybrid complex. Although the mechanism is not fully understood, it is speculated that when the organic-inorganic hybrid complex of the present application is applied to the coating of a separator for a secondary battery, the intermolecular hydrogen bonds are fully formed between the polar group of the organic ligand and the solvent molecule of the secondary battery electrolyte, thereby ensuring that the electrolyte infiltration of the separator is sufficiently improved to meet the requirements of reducing polarization; at the same time, the stability of the three-dimensional structure of the organic-inorganic hybrid complex in the separator coating is maintained and the structure does not collapse during the charging/discharging of the secondary battery cells. In addition, by applying the defect percentage within the range as described above, the occurrence of side reactions in the secondary battery can also be suppressed, such that the cycle life of the cell can be improved.

In the present application, optionally, the defects can be formed by adding an appropriate amount of a defect-introducing substance during the preparation of the organic-inorganic hybrid complex. As non-limiting examples, the defect-introducing substance may be an acidic substance, a basic substance, a redox agent or a complexing agent, etc. For example, in the process for synthesizing the organic-inorganic hybrid complex by a liquid phase coprecipitation method, in the process of adding dropwise a solution containing a salt of the metal M to a solution containing an acid, anhydride or salt of the corresponding ligand, adding an appropriate amount of other types of acids to introduce defects in the resulting organic-inorganic hybrid complex. By changing the amount of the defect-inducing substance or other raw materials that are added, the defect percentage of the prepared organic-inorganic hybrid complex can be adjusted so that the defect percentage falls within the range specified in the present application, thereby fully improving the electrolyte infiltration of the secondary battery separator, increasing the electrolyte retention rate, reducing polarization, and improving the power density and cycle life of the battery.

In the organic-inorganic hybrid complex of the present application, the basic units represented by formula (I) can be periodically assembled in at least one of three spatial directions X', Y' and Z', wherein the three spatial directions X', Y' and Z' in each case form an angle of 0-75 degree, optionally 5-60 degree, with the X, Y and Z directions in the cartesian coordinate system. In one embodiment, the basic units represented by formula (I) can be periodically assembled in at least one spatial direction of the X, Y and Z directions in the cartesian coordinate system.

In the organic-inorganic hybrid complex of the present application, the number of the basic units represented by formula (I) periodically assembled in at least one spatial direction can be about 3 to about 10,000.

In another aspect, the present application further provides a coating composition for a secondary battery separator, wherein the coating composition can comprise the organic-inorganic hybrid complex of the present application as described above.

The coating composition of the present application can be prepared by mixing the organic-inorganic hybrid complex of the present application with a binder in an appropriate manner.

In the coating composition of the present application, the content of the organic-inorganic hybrid complex can be about 12 wt % to about 90 wt % based on the total weight of the coating composition. The content of the organic-inorganic hybrid complex is optionally not lower than about 17 wt %, more optionally not lower than about 24 wt %, more optionally not lower than about 27 wt %, and more optionally not lower than about 34 wt % based on the total weight of the coating composition, and the content of the organic-inorganic hybrid complex is optionally not higher than about 90 wt %, more optionally not higher than about 85 wt %, more optionally not higher than about 80 wt %, more optionally not higher than about 75 wt %, and more optionally not higher than about 68 wt % based on the total weight of the coating composition. In one embodiment, the content of the organic-inorganic hybrid complex can be about 17 wt % to about 85 wt % based on the total weight of the coating composition. In one embodiment, the content of the organic-inorganic hybrid complex can be about 34 wt % to about 68 wt % based on the total weight of the coating composition.

Optionally, the coating composition of the present application can further comprise inorganic particles. For example, the inorganic particles can be selected from boehmite, zeolite, molecular sieves, alumina, aluminum oxyhydroxide, silica, aluminum nitride, silicon carbide, magnesia, calcium oxide, zinc oxide, zirconia, titanium oxide and mixtures thereof In this case, the organic-inorganic hybrid complex and inorganic particles can be combined more closely due to the complementarity between the particle morphologies. The organic-inorganic hybrid complex plays a role in improving infiltration, improving the electrolyte retention rate and increasing the electrolyte injection rate of a cell, while the inorganic particles can provide a rigid and stable separator structure, and the two have a combined effect Where the coating composition of the present application comprises inorganic particles, the mass percentage of the organic-inorganic hybrid complex can be about 15 wt % to about 85 wt % based on the total mass of the organic-inorganic hybrid complex and the inorganic particles in the coating composition. The mass percentage of the organic-inorganic hybrid complex can be no less than about 20 wt %, more optionally no less than about 35 wt %, more optionally no less than about 40 wt %, more optionally about 55 wt % based on the total mass of the organic-inorganic hybrid complex and the inorganic particles in the coating composition, and the mass percentage of the organic-inorganic hybrid complex can be no more than about 80 wt %, optionally no more than about 75 wt %, more optionally no more than about 65 wt %, more optionally no more than about 60 wt % based on the total mass of the organic-inorganic hybrid complex and the inorganic particles in the coating composition. In one embodiment, the mass percentage of the organic-inorganic hybrid complex can be about 20 wt % to about 80 wt % based on the total mass of the organic-inorganic hybrid complex and the inorganic particles in the coating composition. In one embodiment, the mass percentage of the organic-inorganic hybrid complex can be about 40 wt % to about 80 wt % based on the total mass of the organic-inorganic hybrid complex and the inorganic particles in the coating composition. In one embodiment, the mass percentage of the organic-inorganic hybrid complex can be about 40 wt % to about 60 wt % based on the total mass of the organic-inorganic hybrid complex and the inorganic particles in the coating composition.

Optionally, the coating composition of the present application may also include one or more additives, for example, one or more components selected from binders, stabilizers, wetting agents, defoamers, rheology modifiers, pH adjusters.

As non-limiting examples, the binder in the coating composition may be acrylic acid, methyl acrylate, an acrylic acid-acrylate-acrylonitrile copolymer, or mixtures thereof.

As non-limiting examples, the stabilizer in the coating composition may be methyl cellulose, hydroxyethyl cellulose, sodium carboxymethyl cellulose, or mixtures thereof.

As non-limiting examples, the wetting agent in the coating composition may be a polyoxyethylene ether, a polyether silicone copolymer, a polyoxyethylene alkanolamide, or a mixture thereof.

As non-limiting examples, the defoamer in the coating composition may be polyoxypropylene glyceryl ether, polyoxyethylene oxypropylene glyceryl ether, polydimethylsiloxane, or mixtures thereof.

As non-limiting examples, the rheology modifier in the coating composition can be ethanol, propylene glycol, glycerol or mixtures thereof.

As non-limiting examples, the pH adjuster in the coating composition may be hydrochloric acid, sodium hydroxide, lithium hydroxide, sodium phosphate, sodium dihydrogen phosphate, lithium phosphate, lithium dihydrogen phosphate, or mixtures thereof.

In another aspect, the present application further provides a separator for a secondary battery. The separator for a secondary battery of the present application can comprise a polymer substrate layer and a coating coated onto the substrate layer, wherein the coating can comprise the organic-inorganic hybrid complex of the present application as described above or the coating composition of the present application as described above.

The present application further provides a secondary battery, and the secondary battery comprises a positive electrode, a negative electrode, an electrolyte and the separator for a secondary battery of the present application as described above.

The present application further provides a battery module comprising the secondary battery of the present application as described above.

The present application further provides a battery pack comprising a battery module of the present application as described above.

The present application further provides a power consuming device comprising the secondary battery of the present application as described above, or the battery module of the present application as described above, or the battery pack of the present application as described above, or a combination thereof.

In the secondary battery of the present application, by using the organic-inorganic hybrid complex of the present application in a coating of the separator, the electrolyte infiltration of the separator is significantly improved and the electrolyte retention rate is greatly increased, such that the polarization is reduced and finally the power density and cycle life of the secondary battery are significantly improved.

The secondary battery, battery module, battery pack, and device of the present application will be described below by appropriately referring to the accompanying drawings.

In one embodiment of the present application, a secondary battery is provided.

Typically, a secondary battery comprises a positive electrode plate, a negative electrode plate, an electrolyte and a separator. During the charging/discharging process of the battery, active ions are intercalated and de-intercalated back and forth between the positive electrode plate and the negative electrode plate. The electrolyte is between the positive electrode plate and the negative electrode plate and functions for an ionic conduction. The separator is provided between the positive electrode plate and the negative electrode plate, and mainly prevents the positive and negative electrodes from short-circuiting and enables ions to pass through.

[Positive Electrode Plate]

The positive electrode plate includes a positive electrode current collector and a positive electrode film layer provided on at least one surface of the positive electrode current collector, wherein the positive electrode film layer includes a positive electrode active material, and the positive electrode active material includes, but is not limited to, lithium cobalt oxide, lithium nickel manganese cobalt oxide, lithium nickel manganese aluminum oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganate, spinel nickel manganate, lithium titanate, etc. One or more of the materials can be used as the positive electrode active material.

As examples, the positive electrode current collector has two surfaces opposite in its own thickness direction, and the positive electrode film layer is provided on either or both of the two opposite surfaces of the positive electrode current collector.

In the secondary battery of the present application, a metal foil or a complex current collector can be used as the positive electrode current collector. For example, as the metal foil, an aluminum foil can be used. The complex current collector may include a polymer material substrate and a metal layer formed on at least one surface of the polymer material substrate. The complex current collector can be formed by forming a metal material (aluminum, aluminum alloys, nickel, nickel alloys, titanium, titanium alloys, silver and silver alloys, etc.) on a polymer material substrate (such as polypropylene (PP), polyethylene terephthalate (PET), polybutylene terephthalate (PBT), polystyrene (PS), polyethylene (PE), etc.).

The positive electrode film layer also optionally includes a conductive agent. However, the types of the conductive agent are not specifically limited, which can be selected by those skilled in the art according to actual needs. As examples, the conductive agent for the positive electrode film layer may be selected from one or more of superconducting carbon, acetylene black, carbon black, Ketjen black, carbon dots, carbon nanotubes, graphene, and carbon nanofibers.

In the present application, the positive electrode plate can be prepared according to methods known in the art. As examples, a positive electrode active material of the present application, a conductive agent, and a binder can be dispersed in a solvent (such as N-methylpyrrolidone, NMP) to form a uniform positive electrode slurry; and the positive electrode slurry is coated onto a positive electrode current collector, followed by procedures such as drying and cold pressing to obtain the positive electrode plate.

[Negative Electrode Plate]

The negative electrode plate comprises a negative electrode current collector and a negative electrode film layer provided on at least one surface of the negative electrode current collector, wherein the negative electrode film layer comprises a negative electrode active material.

In the secondary battery of the present application, the negative electrode active material can be the negative electrode active material commonly used in the art for preparing a negative electrode of a secondary battery; as the negative electrode active material, synthetic graphite, natural graphite, soft carbon, hard carbon, silicon-based materials, tin-based materials and lithium titanate, etc., can be listed. The silicon-based material can be selected from one or more of elemental silicon, a silicon oxide compound (for example, silicon(II) oxide), a silicon-carbon complex, a silicon-nitrogen complex, and a silicon alloy. The tin-based material can be selected from one or more of elemental tin, a tin oxide compound, and a tin alloy.

As examples, the negative electrode current collector has two surfaces opposite in its own thickness direction, and the negative electrode film layer is provided on either or both of the two opposite surfaces of the negative electrode current collector.

In the secondary battery of the present application, a metal foil or a complex current collector can be used as the negative electrode current collector. For example, as the metal foil, a copper foil can be used. The complex current collector may include a polymer material substrate and a metal layer formed on at least one surface of the polymer material substrate. The complex current collector can be formed by forming metal materials (copper, copper alloys, nickel, nickel alloys, titanium, titanium alloys, silver and silver alloys, etc.) on the polymer material substrate (such as polypropylene (PP), polyethylene terephthalate (PET), polybutylene terephthalate (PBT), polystyrene (PS), polyethylene (PE), etc.).

In the secondary battery of the present application, the negative electrode film layer usually comprises the negative electrode active material and a optional binder, a optional conductive agent and other optional auxiliary agents, and is usually formed by coating negative electrode slurry, followed by drying. The negative electrode slurry is usually formed by dispersing the negative electrode active material and an optional conductive agent and a binder, etc. in a solvent and stirring same until uniform. The solvent can be N-methylpyrrolidone (NMP) or deionized water.

As examples, the conductive agent may be selected from one or more of superconducting carbon, acetylene black, carbon black, Ketjen black, carbon dots, carbon nanotubes, graphene, and carbon nanofibers.

As examples, the binder may be selected from one or more of a styrene butadiene rubber (SBR), polyacrylic acid (PAA), sodium polyacrylate (PAAS), polyacrylamide (PAM), polyvinyl alcohol (PVA), sodium alginate (SA), polymethacrylic acid (PMAA), and carboxymethyl chitosan (CMCS).

The other optional auxiliary agents are, for example, a thickening agent (for example, sodium carboxymethyl cellulose, CMC-Na), etc.

In some embodiments, the positive electrode plate, the negative electrode plate and the separator can form an electrode assembly by a winding process or a lamination process. [Electrolyte]

There is no specific limitation on the type of the electrolyte in the embodiments of the present application, and the electrolyte can be selected according to actual needs. For example, the electrolyte can be solid or liquid.

In some embodiments, the electrolyte is liquid and typically includes an electrolyte salt and a solvent.

As examples, the electrolyte salt can be selected from one or more of lithium hexafluorophosphate (LiPF$_6$), lithium tetrafluoroborate (LiBF$_4$), lithium perchlorate (LiClO$_4$), lithium hexafluoroarsenate (LiAsF$_6$), lithium bisfluorosulfonimide (LiFSI), lithium bistrifluoromethanesulfonimide (LiTFSI), lithium trifluoromethanesulfonate (LiTFS), lithium difluorooxalate borate (LiDFOB), lithium dioxalate borate (LiBOB), lithium difluorophosphate (LiPO$_2$F$_2$), lithium bisoxalatodifluorophosphate (LiDFOP) and lithium tetrafluorooxalate phosphate (LiTFOP).

As examples, the solvent may be selected from one or more of fluoroethylene carbonate (FEC), ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS) and diethyl sulfone (ESE).

In some embodiments, the electrolyte also optionally comprises an additive. For example, the electrolyte can include a negative electrode film-forming additive, a positive electrode film-forming additive, an additive to improve the overcharge performance of a battery, an additive to improve the high temperature performance of a battery, and an additive to improve the low temperature performance of a battery, etc.

[Separator]

The separator separates the positive electrode plate from the negative electrode plate, prevent internal short circuits within the battery, and at the same time allow active ions to pass through the separator and move between the positive and negative electrodes. In the secondary battery of the present application, as the separator that has the above-mentioned functions, the separator for a secondary battery including a polymer substrate layer and a coating layer coated on the substrate layer of the present application as described above is used. —In the separator, the coating can comprise the organic-inorganic hybrid complex of the present application as described above or the coating composition of the present application as described above.

In the present application, the type of the polymer substrate layer is not particularly limited, and any well-known polymer substrate layer with good chemical and mechanical stabilities can be used. In some embodiments, any well-known porous structure film for a secondary battery may be used as the substrate layer of the separator for a secondary battery of the present application. For example, the substrate layer may be selected from one or more of a glass fiber film, a non-woven film, a polyethylene (PE) film, a polypropylene (PP) film, a polyvinylidene fluoride film, and a multilayer complex film comprising one or two or more of them. In some embodiments, a common microporous polyolefin film in the art may be used as the substrate layer of the separator for a secondary battery of the present application. As non-limiting examples, the microporous polyolefin films may be polyethylene (PE) monolayer films, polypropylene (PP) monolayer films, and microporous PP/PE/PP multilayer films formed by combining PP and PE. For example, a microporous PP-PE copolymer film having a thickness of about 20 µm and an average pore size of about 80 nm can be used as the substrate layer of the separator for a secondary battery of the present application.

The organic-inorganic hybrid complex of the present application or the coating composition of the present application may be applied to the polymer substrate layer by common methods in the art, thereby forming a coating coated on the substrate layer. For example, a slurry including the organic-inorganic hybrid complex of the present application or the coating composition of the present application can be applied to at least one surface of the substrate layer of the separator for a secondary battery by a conventional coating method, such as a blade coating method and form a wet coating on the surface. The solid content of the slurry may be about 5% to about 10%, e.g. about 9%. After drying the wet coating, a coating is formed on at least one surface of the separator. The thickness of the coating may be about 1-8 µm, e.g. about 5 µm.

In some embodiments, the secondary battery may be a lithium ion secondary battery.

In some embodiments, the positive electrode plate, the negative electrode plate and the separator can form an electrode assembly by a winding process or a lamination process.

In some embodiments, the secondary battery can comprises an outer package. The outer package can be used to package the electrode assembly and electrolyte as described above.

In some embodiments, the outer package of the secondary battery can be a hard shell, for example, a hard plastic shell, an aluminum shell, a steel shell, etc. The outer package of the secondary battery can also be a soft bag, such as a pouch-type soft bag. The material of the soft bag can be a plastic, and as a plastic, polypropylene (PP), polybutylene terephthalate (PBT), polybutylene succinate (PBS), etc., can be listed.

In the present application, the shape of the secondary battery is not particularly limited, and can be a cylindrical shape, a prismatic shape or any other shapes. For example, FIG. 1 shows a prismatic secondary battery 5 as an example.

Figure 2:
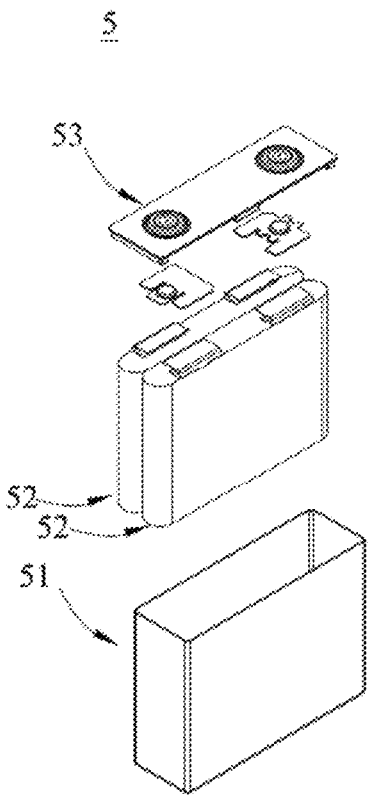
FIG. 2 is an exploded view of a secondary battery according to an embodiment of the present application shown in FIG. 1.

In some embodiments, referring to FIG. 2, the outer package can include a housing 51 and a cover plate 53, wherein the housing 51 can include a bottom plate and side plates connected to the bottom plate, and the bottom plate and the side plates enclose and form an accommodating cavity. The housing 51 has an opening in communication with the accommodating cavity, and the cover plate 53 can cover the opening to close the accommodating cavity. The positive electrode plate, the negative electrode plate and the separator can form an electrode assembly 52 by a winding process or a lamination process. The electrode assembly 52 is packaged in the accommodating cavity. The electrolyte is infiltrate into the electrode assembly 52. The number of the electrode assemblies 52 contained in the secondary battery 5 may be one or more, and may be selected by those skilled in the art according to actual requirements.

In some embodiments, the secondary battery can be assembled into a battery module, and the number of the secondary batteries contained in the battery module can be one or more, and the specific number can be selected by those skilled in the art according to the application and capacity of the battery module.

Figure 3:
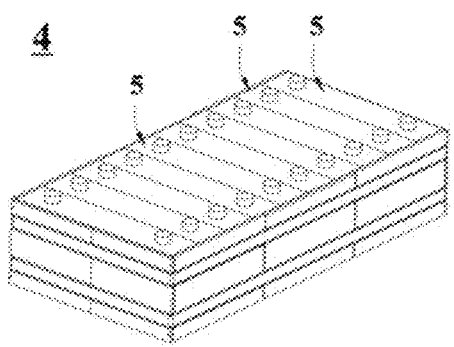
FIG. 3 is a schematic diagram of a battery module according to an embodiment of the present application.

FIG. 3 shows a battery module 4 as an example. Referring to FIG. 3, in the battery module 4, a plurality of secondary batteries 5 can be provided sequentially in the length direction of the battery module 4. Apparently, the secondary batteries can also be disposed in any other manner. Furthermore, the plurality of secondary batteries 5 can be fixed by fasteners.

Optionally, the battery module 4 may also comprise a housing with an accommodating space, and a plurality of secondary batteries 5 are accommodated in the accommodating space.

In some embodiments, the battery module can also be assembled into a battery pack, and the number of the battery modules contained in the battery pack can be selected by those skilled in the art according to the application and capacity of the battery pack.

Figure 4:
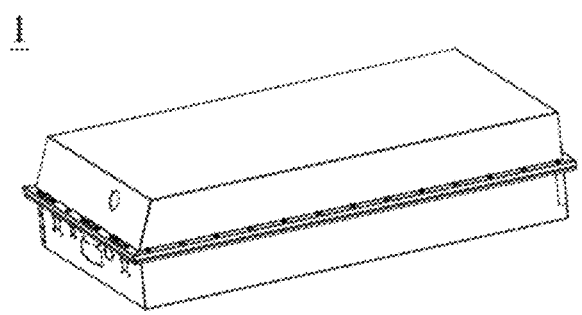
FIG. 4 is a schematic diagram of a battery pack according to an embodiment of the present application.
Figure 5:
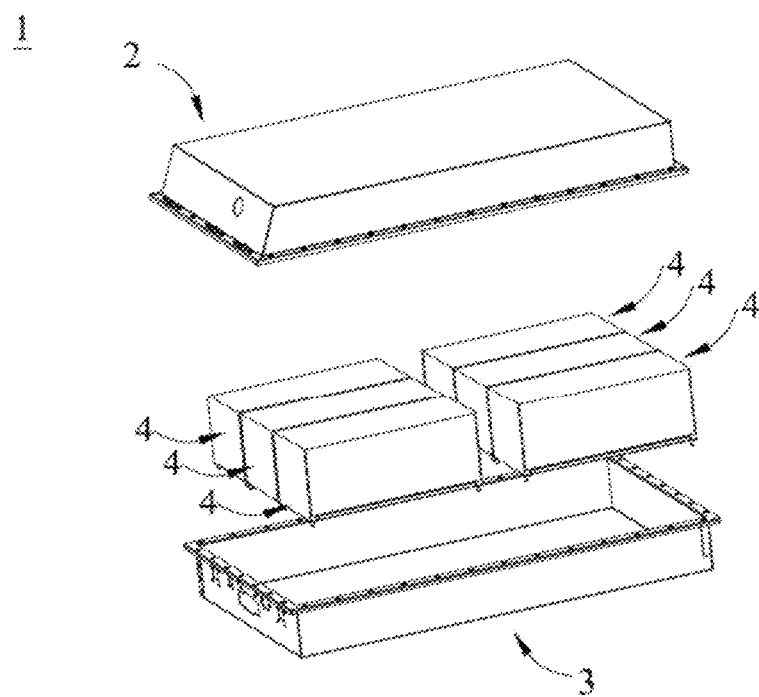
FIG. 5 is an exploded view of the battery pack shown in FIG. 4 according to an embodiment of the present application.

FIG. 4 and FIG. 5 show a battery pack 1 as an example. Referring to FIGS. 4 and 5, the battery pack 1 can include a battery case and a plurality of battery modules 4 disposed in the battery case. The battery case comprises an upper case body 2 and a lower case body 3, wherein the upper case body 2 can cover the lower case body 3 to form a closed space for accommodating the battery modules 4. A plurality of battery modules 4 can be disposed in the battery case in any manner.

In addition, the present application further provides a device which comprises one or more of the secondary battery, battery module or battery pack provided by the present application. The secondary battery, battery module or battery pack may be used as a power source of the device or as an energy storage unit of the device. The device may be, but is not limited to, a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like.

As a power consuming device, the secondary battery, battery module or battery pack can be selected according to the usage requirements thereof.

Figure 6:
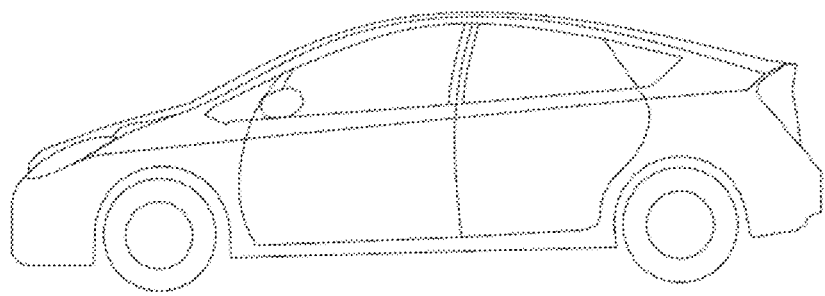
FIG. 6 is a schematic diagram of a device according to an embodiment of the present application, wherein a secondary battery is used as a power source.

FIG. 6 shows a power consuming device as an example. The device may be a pure electric vehicle, a hybrid electric vehicle, a plug-in hybrid electric vehicle or the like. In order to meet the requirements of the power consuming device for a high power and a high energy density of a secondary battery, a battery pack or a battery module can be used.

As another example, the power consuming device may be a mobile phone, a tablet, a laptop computer, etc. The device is generally required to be thin and light, and may use a secondary battery as a power source.

The above summary of the present application is not intended to describe every disclosed embodiment or every implementation of the present application. The following description will illustrate exemplary embodiments in more detail. Throughout the application, teachings are provided by means of a number of embodiments, which can be used in various combinations. In each instance, a list is only a representative group and should not be interpreted as exhaustive.

In the following preparation examples, implementation examples and application examples, it is intended that the described steps are carried out under common conditions or conditions suggested by the manufacturers, info specific conditions are indicated. The reagents or instruments used, if they are not marked with the manufacturer, are common products that are commercially available.

Preparation of Organic-Inorganic Hybrid Complex

In general, the organic-inorganic hybrid complex of the present application can be prepared by a liquid phase coprecipitation method. An acid, acid anhydride or salt containing a corresponding ligand L, and a salt containing a corresponding metal M or metal cluster $M_aC_b$ are stirred and mixed in a polar solvent such as water or ammonia water, ethanol, methanol or DMF, and reacted at a temperature from room temperature to 150° C., and a defect-introducing substance such as an acidic substance, a basic substance, a redox agent, is added. After the reaction is completed, the reaction mixture is aged for about 1-48 hours. Thereafter, a solid product is recovered by suction filtration. The recovered solid product is activated at a temperature of about 140° C. to about 160° C. for about 8-12 hours to obtain a final organic-inorganic hybrid complex product.

Preparation Example 1

Equimolar amounts of $FeCl_2$ (127 g) and $Na_4Fe(CN)_6$ (304 g) are weighed as raw materials. The two raw materials are respectively added to 10 L of deionized water to prepare a 0.1 M $FeCl_2$ solution and a 0.1 M $Na_4Fe(CN)_6$ solution. The two solutions are each heated to about 80° C. and maintained at that temperature. The $FeCl_2$ solution is added dropwise to the $Na_4Fe(CN)_6$ solution at a rate of about 1 mL/min, so that a co-precipitation reaction occurs to obtain a precipitate. During the dropwise addition, an acidic substance, i.e. dilute hydrochloric acid (in a mass of 3.5 g based on pure HCl) is poured in one go, thereby introducing ligand defects. After the reaction is finished, the reaction mixture is aged at about 80° C. for about 24 hours. Thereafter, a solid product is recovered by suction filtration. Thereafter, the recovered solid product is activated at a temperature of about 150° C. for about 10 hours. Finally, 133 g of a solid product is obtained.

The obtained solid product is characterized to determine the chemical formula of the basic unit of the final organic-inorganic hybrid complex. Specifically, the obtained solid product is vacuum-dried at 150° C. as a sample to be tested to remove the adsorbed water impurities. The sample is then measured by ICP (SPECTRO BLUE, from SPECTRO Analytical Instruments GmbH), which determines the percentages of Fe and Na to be 37.76% and 11.97%, respectively. In addition, the percentages of C and N are determined to be 22.93% and 26.75% by carbon sulfur measurement (a carbon sulfur analyzer, CS844, from LECO Corporation) and elemental analysis (Vario EL III, from Elementar Analysensysteme GmbH). Through the above measurements, the experimental formula of the product is determined to be $(CN)_{2.79}Fe.Na_{0.76}$. The theoretical formula of the corresponding defect-free product is determined to be $(CN)_3Fe.Na$, by element valence determination and observation under an in-situ cold field emission gun double spherical aberration corrected transmission electron microscope (Talos F200i, from Thermo Fisher Scientific Inc.). From the above results, it can be concluded that the organic-inorganic hybrid complex actually obtained in this preparation example has a basic unit represented by $[(CN)_{2.79}\square_{0.21}]Fe.Na_{0.76}$. In the organic-inorganic hybrid complex prepared in this preparation example, the defect percentage is 7.0%.

Figure 7:
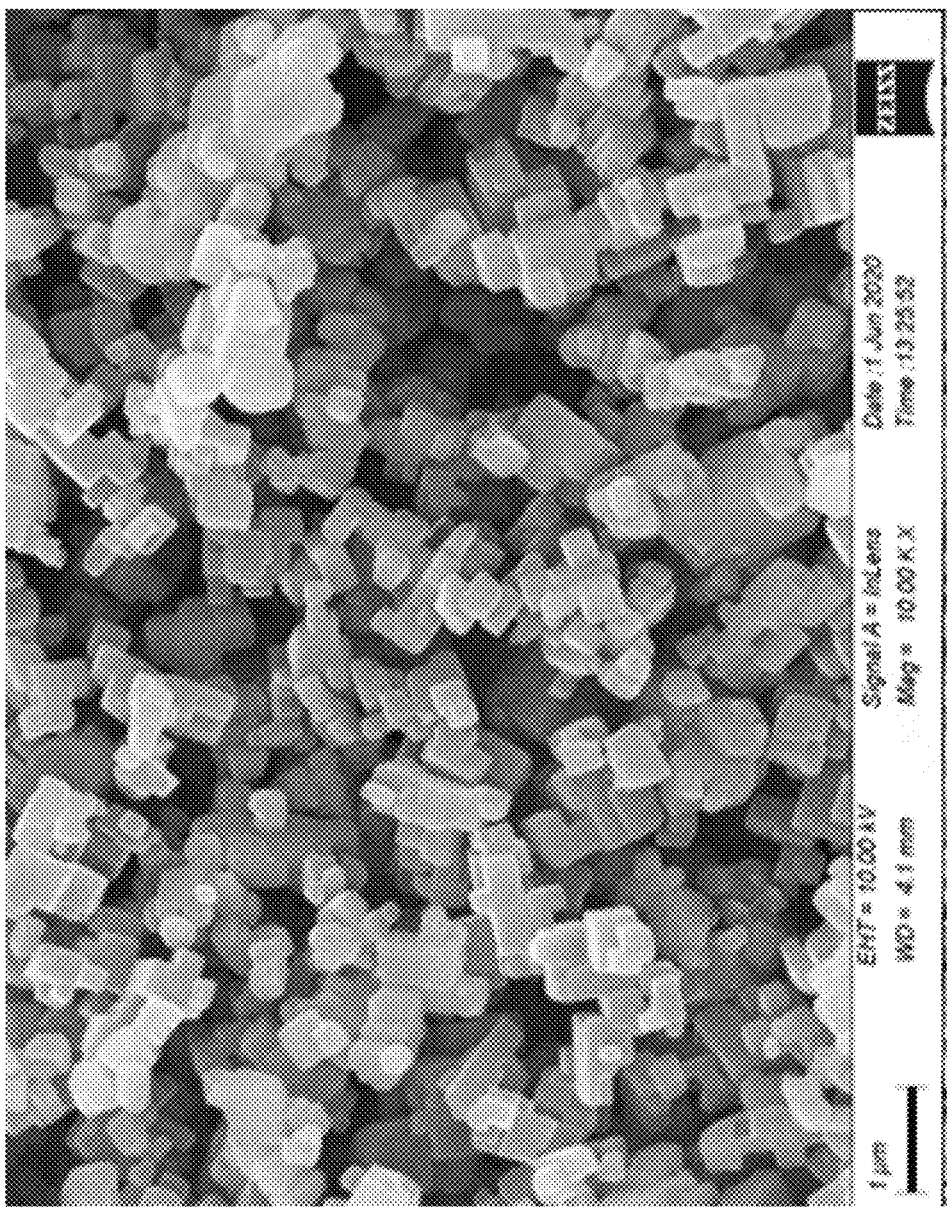
FIG. 7 is an SEM picture of a material obtained in preparation example 1.

The obtained organic-inorganic hybrid complex material is characterized by scanning electron microscopy (SEM) (Sigma300, from Carl-Zeiss Jena GmbH). The obtained SEM picture is shown in FIG. 7.

Preparation Example 2

An organic-inorganic hybrid complex is prepared by a preparation method substantially the same as that in preparation example 1, and the difference only lies in that the diluted hydrochloric acid added during the preparation is 0.6 g in pure HCl. Finally, 141 g of a solid product is obtained.

By the same characterization methods as those in preparation example 1, it is determined that the organic-inorganic hybrid complex prepared in this preparation example has a basic unit represented by $[(CN)_{2.97}\square_{0.03}]Fe.Na_{0.95}$. In the organic-inorganic hybrid complex prepared in this preparation example, the defect percentage is 1.0%.

Preparation Example 3

An organic-inorganic hybrid complex is prepared by a preparation method substantially the same as that in preparation example 1, and the difference only lies in that the diluted hydrochloric acid added during the preparation is 2.8 g in pure HCl. Finally, 139 g of a solid product is obtained.

By the same characterization methods as those in preparation example 1, it is determined that the organic-inorganic hybrid complex prepared in this example has a basic unit represented by $[(CN)_{2.925}\square_{0.075}]Fe.Na_{0.90}$. In the organic-inorganic hybrid complex prepared in this example, the defect percentage is 2.5%.

Preparation Example 4

An organic-inorganic hybrid complex is prepared by a preparation method substantially the same as that in preparation example 1, and the difference only lies in that the diluted hydrochloric acid added during the preparation is 9.7 g in pure HCl. Finally, 118 g of a solid product is obtained.

By the same characterization methods as those in preparation example 1, it is determined that the organic-inorganic hybrid complex prepared in this example has a basic unit represented by $[(CN)_{2.46\square 0.54}]Fe.Na_{0.42}$. In the organic-inorganic hybrid complex prepared in this example, the defect percentage is 18.0%.

Preparation Example 5

An organic-inorganic hybrid complex is prepared by a preparation method substantially the same as that in preparation example 1, and the difference only lies in that the diluted hydrochloric acid added during the preparation is 13.2 g in pure HCl. Finally, 108 g of a solid product is obtained.

By the same characterization methods as those in preparation example 1, it is determined that the organic-inorganic hybrid complex prepared in this example has a basic unit represented by $[(CN)_{2.25\square 0.75}]Fe.Na_{0.2}$. In the organic-inorganic hybrid complex prepared in this example, the defect percentage is 25.0%.

Preparation Example 6

The organic-inorganic hybrid complex is prepared by a preparation method substantially the same as that in preparation example 1, and the differences only lie in that a 0.1 M $MnCl_2$ solution and a 0.1 M $Na_4Mn(CN)_6$ solution are prepared in 10 L deionized water to replace the 0.1 M $FeCl_2$ solution and 0.1 M $Na_4Fe(CN)_6$ solution in preparation example 1, respectively, for a coprecipitation reaction; and no dilute hydrochloric acid is added during the preparation, but the ligand defect is introduced by continuously feeding $O_2$. The $O_2$ flow rate is 1.7× total solution volume/hour. Finally, 132 g of a solid product is obtained.

Through measurement methods similar to those in preparation example 1, the experimental formula of the product is determined to be $(CN)_{2.79}Mn.Na_{0.76}$. In addition, through methods similar to those in preparation example 1, the theoretical formula of the corresponding defect-free product is determined to be $(CN)_3Mn.Na$. From the above results, it can be concluded that the organic-inorganic hybrid complex actually obtained in this preparation example has a basic unit represented by $[(CN)_{2.79\square 0.21}]Mn.Na_{0.76}$. In the organic-inorganic hybrid complex prepared in this preparation example, the defect percentage is 7.0%.

Preparation Example 7

An organic-inorganic hybrid complex is prepared by a preparation method substantially the same as that in preparation example 6, and the differences only lie in that a 0.1 M $CoCl_2$ solution and a 0.1 M $Na_4Co(CN)_6$ solution are prepared in 10 L deionized water to replace the 0.1 M $MnCl_2$ solution and 0.1 M $Na_4Mn(CN)_6$ solution in preparation example 6, respectively, for a coprecipitation reaction. Finally, 136 g of a solid product is obtained.

Through measurement methods similar to those in preparation example 1, the experimental formula of the product is determined to be $(CN)_{2.79}Co.Na_{0.76}$. In addition, through methods similar to those in preparation example 1, the theoretical formula of the corresponding defect-free product is determined to be $(CN)_3Co.Na$. From the above results, it can be concluded that the organic-inorganic hybrid complex actually obtained in this preparation example has a basic unit represented by $[(CN)_{2.79\square 0.21}]Co.Na_{0.76}$. In the organic-inorganic hybrid complex prepared in this preparation example, the defect percentage is 7.0%.

Preparation Example 8

An organic-inorganic hybrid complex is prepared by a preparation method substantially the same as that in preparation example 6, and the differences only lie in that a 0.1 M $MnCl_2$ solution and a 0.1 M $Na_4Fe(CN)_6$ solution are prepared in 10 L deionized water to replace the 0.1 M $MnCl_2$ solution and 0.1 M $Na_4Mn(CN)_6$ solution in example 6, respectively, for a coprecipitation reaction. Finally, 136 g of a solid product is obtained.

Through measurement methods similar to those in preparation example 1, the experimental formula of the product is determined to be $(CN)_{2.79}[Fe_{0.5}Mn_{0.5}].Na_{0.76}$. In addition, through methods similar to those in preparation example 1, the theoretical formula of the corresponding defect-free product is determined to be $(CN)_3[Fe_{0.5}Mn_{0.5}].Na$. From the above results, it can be concluded that the organic-inorganic hybrid complex actually obtained in this preparation example has a basic unit represented by $[(CN)_{2.79\square 0.21}][Fe_{0.5}Mn_{0.5}].Na_{0.76}$. In the organic-inorganic hybrid complex prepared in this preparation example, the defect percentage is 7.0%.

Preparation Example 9

An organic-inorganic hybrid complex is prepared by a preparation method substantially the same as that in preparation example 1, the differences only lie in that $Co(NO_3)_2$ and 5-chlorobenzimidazole are used as raw materials, and 10 L of a mixed solvent of $H_2O$ and DMF (1:1) is used to replace the deionized water used in preparation example 1 to prepare a 0.1 M $Co(NO_3)_2$ solution and a 0.2 M 5-chlorobenzimidazole solution, respectively, for replacing the 0.1 M $FeCl_2$ solution and 0.1 M $Na_4Fe(CN)_6$ solution in preparation example 1, for a coprecipitation reaction; and no dilute hydrochloric acid is added during the preparation, but the ligand defect is introduced by adding 3.3 g of NaOH. Finally, 293 g of a solid product is obtained.

Through measurement methods similar to those in preparation example 1, the experimental formula of the product is determined to be $(cbIm)_{1.86}Co$. In addition, through methods similar to those in preparation example 1, the theoretical formula of the corresponding defect-free product is determined to be $(cbIm)_2Co$. From the above results, it can be concluded that the organic-inorganic hybrid complex actually obtained in this preparation example has a basic unit represented by $[(cbIm)_{1.86\square 0.14}]Co$. In the organic-inorganic hybrid complex prepared in this preparation example, the defect percentage is 7.0%.

Preparation Example 10

An organic-inorganic hybrid complex is prepared by a preparation method substantially the same as that in preparation example 9, and the difference only lies in that the mass of NaOH added during the preparation is 0.6 g. Finally, 309 g of a solid product is obtained.

By the similar characterization methods to those in preparation example 9, it is determined that the organic-inorganic hybrid complex prepared in this preparation example has a basic unit represented by $[(cbIm)_{1.98\square 0.02}].Co$. In the organic-inorganic hybrid complex prepared in this preparation example, the defect percentage is 1.0%.

Preparation Example 11

An organic-inorganic hybrid complex is prepared by a preparation method substantially the same as that in preparation example 9, and the difference only lies in that the mass of NaOH added during the preparation is 1.2 g. Finally, 305 g of a solid product is obtained.

By the similar characterization methods to those in preparation example 9, it is determined that the organic-inorganic hybrid complex prepared in this preparation example has a basic unit represented by $[(cbIm)_{1.95\square 0.05}]Co$. In the organic-inorganic hybrid complex prepared in this preparation example, the defect percentage is 2.5%.

Preparation Example 12

An organic-inorganic hybrid complex is prepared by a preparation method substantially the same as that in preparation example 9, and the difference only lies in that the mass of NaOH added during the preparation is 4.5 g. Finally, 265 g of a solid product is obtained.

By the similar characterization methods to those in preparation example 9, it is determined that the organic-inorganic hybrid complex prepared in this preparation example has a basic unit represented by $[(cbIm)_{1.64\square 0.36}]Co$. In the organic-inorganic hybrid complex prepared in this preparation example, the defect percentage is 18%.

Preparation Example 13

An organic-inorganic hybrid complex is prepared by a preparation method substantially the same as that in preparation example 9, and the difference only lies in that the mass of NaOH added during the preparation is 8.4 g. Finally, 246 g of a solid product is obtained.

By the similar characterization methods to those in preparation example 9, it is determined that the organic-inorganic hybrid complex prepared in this preparation example has a basic unit represented by $[(cbIm)_{1.50\square 0.50}]Co$. In the organic-inorganic hybrid complex prepared in this preparation example, the defect percentage is 25%.

Preparation Example 14

An organic-inorganic hybrid complex is prepared by a preparation method substantially the same as that in preparation example 1, and the differences only lie in that the raw materials used are trimesic acid tripotassium salt, trimesic acid and $Cu(NO_3)_2$, and 10 L of a mixed solvent of $H_2O$ and EtOH (1:1) is used to replace the deionized water used in preparation example 1 for respectively preparing a 0.05 M trimesic acid tripotassium salt solution, a 0.25 M trimesic acid solution, and a 0.45 M $Cu(NO_3)_2$ solution in sequence and the solutions are mixed in one by one in sequence; and the mass of the diluted hydrochloric acid added during the preparation is 3.7 g in pure HCl. Finally, 758 g of a solid product is obtained.

Through measurement methods similar to those in preparation example 1, the experimental formula of the product is determined to be $(BTC)_{1.86}Cu_3.K$. In addition, through methods similar to those in preparation example 1, the theoretical formula of the corresponding defect-free product is determined to be $(BTC)_2Cu_3.K$. From the above results, it can be concluded that the organic-inorganic hybrid complex actually obtained in this preparation example has a basic unit represented by $[(BTC)_{1.86\square 0.14}]Cu_3.K$. In the organic-inorganic hybrid complex prepared in this preparation example, the defect percentage is 7.0%.

Preparation Example 15

An organic-inorganic hybrid complex is prepared by a preparation method substantially the same as that in preparation example 1, and the differences only lie in that the raw materials used are terephthalic acid monolithium salt, terephthalic acid, $Fe(ClO_4)_3$ and HF, and 10 L of a mixed solvent of $H_2O$ and EtOH (1:1) is used to replace the deionized water used in preparation example 1 for respectively preparing a 0.05 M terephthalic acid monolithium salt solution, a 0.05 M terephthalic acid solution, a 0.1 M $Fe(ClO_4)_3$ solution and a 0.02 M HF solution in sequence and the solutions are mixed in one by one in sequence; and the mass of the diluted hydrochloric acid added during the preparation is 3.7 g in pure HCl. Finally, 188 g of a solid product is obtained.

Through measurement methods similar to those in preparation example 1, the experimental formula of the product is determined to be $(BDC)_{0.93}[Fe(OH)_{0.8}F_{0.2}].Li_{0.5}$. In addition, through methods similar to those in preparation example 1, the theoretical formula of the corresponding defect-free product is determined to be $(BDC)[Fe(OH)_{0.8}F_{0.2}].Li_{0.5}$. From the above results, it can be concluded that the organic-inorganic hybrid complex actually obtained in this preparation example has a basic unit represented by $[(BDC)_{0.93\square 0.07}][Fe(OH)_{0.8}F_{0.2}].Li_{0.5}$. In the organic-inorganic hybrid complex prepared in this preparation example, the defect percentage is 7.0%.

Preparation Example 16

An organic-inorganic hybrid complex is prepared by a preparation method substantially the same as that in preparation example 1, and the differences only lie in that the raw materials used are tris(2-benzimidazolylmethyl)amine magnesium $(Mg_3(NTB)_2)$, tris(2-benzimidazolylmethyl)amine and $Zn(NO_3)_2$, and 10 L of a mixed solvent of $H_2O$ and EtOH (1:1) is used to replace the deionized water used in preparation example 1 for respectively preparing a 0.002 M tris(2-benzimidazolylmethyl)amine magnesium $(Mg_3(NTB)_2)$ solution, a 0.112 M tris(2-benzimidazolylmethyl)amine solution, and a 0.24 M $Zn(NO_3)_2$ solution in sequence and the solutions are mixed in one by one in sequence; and the mass of the diluted hydrochloric acid added during the preparation is 3.7 g in pure HCl. Finally, 519 g of a solid product is obtained.

Through measurement methods similar to those in preparation example 1, the experimental formula of the product is determined to be $(NTB)_{1.86}[Zn_4O].Mg_{0.1}$. In addition, through methods similar to those in preparation example 1, the theoretical formula of the corresponding defect-free product is determined to be $(NTB)_2[Zn_4O].Mg_{0.1}$. From the above results, it can be concluded that the organic-inorganic hybrid complex actually obtained in this preparation example has a basic unit represented by $[(NTB)_{1.86\square 0.14}][Zn_4O].Mg_{0.1}$. In the organic-inorganic hybrid complex prepared in this preparation example, the defect percentage is 7.0%.

Comparative Preparation Example 1

A defect-free organic-inorganic hybrid complex $(CN)_3Fe.Na$ is prepared according to a conventional method.

Specifically, equimolar amounts of $FeCl_2$ (127 g) and $Na_4Fe(CN)_6$ (304 g) are weighed as raw materials. The two raw materials are respectively added to 10 L of deionized water to prepare a 0.1 M $FeCl_2$ solution and a 0.1 M $Na_4Fe(CN)_6$ solution. The two solutions are each heated to about 80° C. and maintained at that temperature. The $FeCl_2$ solution is added dropwise to the $Na_4Fe(CN)_6$ solution at a rate of about 1 mL/min, so that a co-precipitation reaction occurred to obtain a precipitate. After the reaction is finished, the reaction mixture is aged at about 80° C. for about 24 hours. Thereafter, a solid product is recovered by suction filtration. Thereafter, the recovered solid product is activated at a temperature of about 150° C. for about 10 hours. Finally, 146 g of a solid product is obtained.

In the organic-inorganic hybrid complex prepared in this comparative preparation example, no defect exists, i.e. the defect percentage is 0.

Comparative Preparation Example 2

An organic-inorganic hybrid complex is prepared by a preparation method substantially the same as that in preparation example 1, and the difference only lies in that the diluted hydrochloric acid added during the preparation is 0.3 g in pure HCl. Finally, 145 g of a solid product is obtained.

By the same characterization methods as those in preparation example 1, it is determined that the organic-inorganic hybrid complex prepared in this preparation example has a basic unit represented by $[(CN)_{2.985\square 0.015}]Fe.Na_{0.99}$. In the organic-inorganic hybrid complex prepared in this comparative preparation example, the defect percentage is 0.5%.

Comparative Preparation Example 3

An organic-inorganic hybrid complex is prepared by a preparation method substantially the same as that in preparation example 1, and the difference only lies in that the diluted hydrochloric acid added during the preparation is 23.1 g in pure HCl. Finally, 97 g of a solid product is obtained.

By the same characterization methods as those in preparation example 1, it is determined that the organic-inorganic hybrid complex prepared in this preparation example has a basic unit represented by $[(CN)_{1.8\square 1.2}]Fe.Na_{0.1}$. In the organic-inorganic hybrid complex prepared in this comparative preparation example, the defect percentage is 40.0%.

Comparative Preparation Example 4

A defect-free organic-inorganic hybrid complex $(cbIm)_2Co$ is prepared using the method substantially the same as that in comparative preparation example 1 according to a conventional preparation method, and the differences only lie in that $Co(NO_3)_2$ and 5-chlorobenzimidazole are used as raw materials, and 10 L of a mixed solvent of $H_2O$ and DMF (1:1) is used to replace the deionized water used in comparative preparation example 1 to prepare a 0.1 M $Co(NO_3)_2$ solution and a 0.2 M 5-chlorobenzimidazole solution, respectively, for replacing the 0.1 M $FeCl_2$ solution and 0.1 M $Na_4Fe(CN)_6$ solution in comparative preparation example 1, for a coprecipitation reaction. Finally, 326 g of a solid product is obtained.

In the organic-inorganic hybrid complex prepared in this comparative preparation example, no defect exists, i.e. the defect percentage is 0.

Comparative Preparation Example 5

A defect-free organic-inorganic hybrid complex $(BTC)_2Cu_3.K$ is prepared using substantially the same method as in comparative preparation example 1 according to a conventional preparation method, and the differences only lie in that the raw materials used are trimesic acid tripotassium salt, trimesic acid and $Cu(NO_3)_2$, and 10 L of a mixed solvent of $H_2O$ and EtOH (1:1) is used to replace the deionized water used in preparation example 1 for respectively preparing a 0.05 M trimesic acid tripotassium salt solution, a 0.25 M trimesic acid solution, and a 0.45 M $Cu(NO_3)_2$ solution in sequence and the solutions are mixed in one by one in sequence. Finally, 832 g of a solid product is obtained.

In the organic-inorganic hybrid complex prepared in this comparative preparation example, no defect exists, i.e. the defect percentage is 0.

Comparative Preparation Example 6

A defect-free organic-inorganic hybrid complex (BDC) $[Fe(OH)_{0.8}F_{0.2}].Li_{0.5}$ is prepared using the method substantially the same as that in comparative preparation example 1 according to a conventional preparation method, the differences only lie in that the raw materials used are terephthalic acid monolithium salt, terephthalic acid, $Fe(ClO_4)_3$ and HF, and 10 L of a mixed solvent of $H_2O$ and EtOH (1:1) is used to replace the deionized water used in preparation example 1 for respectively preparing a 0.05 M terephthalic acid monolithium salt solution, a 0.05 M terephthalic acid solution, a 0.1 M $Fe(C104)_3$ solution and a 0.02 M HF solution in sequence and the solutions are mixed in one by one in sequence. Finally, 205 g of a solid product is obtained.

In the organic-inorganic hybrid complex prepared in this comparative preparation example, no defect exists, i.e. the defect percentage is 0.

Comparative Preparation Example 7

A defect-free organic-inorganic hybrid complex $(NTB)_2[Zn_4O].Mg_{0.1}$ is prepared using the method substantially the same as that in comparative preparation example 1 according to a conventional preparation method, and the differences only lie in that the raw materials used are tris(2-benzimidazolylmethyl)amine magnesium $(Mg_3(NTB)_2)$, tris(2-benzimidazolylmethyl)amine and $Zn(NO_3)_2$, and 10 L of a mixed solvent of $H_2O$ and EtOH (1:1) is used to replace the deionized water used in preparation example 1 for respectively preparing a 0.002 M tris(2-benzimidazolylmethyl)amine magnesium $(Mg_3(NTB)_2)$ solution, a 0.112 M tris(2-benzimidazolylmethyl)amine solution, and a 0.24 M $Zn(NO_3)_2$ solution in sequence and the solutions are mixed in one by one in sequence. Finally, 567 g of a solid product is obtained.

In the organic-inorganic hybrid complex prepared in this comparative preparation example, no defect exists, i.e. the defect percentage is 0.

Preparation of Separator

Example 1

A commercially available microporous PP-PE copolymer film with a thickness of 20 μm and an average pore size of 80 nm (from Zhuogao Electronic Technology Co., Ltd., model 20) is used as a substrate layer. The organic-inorganic hybrid complex prepared in the above preparation example 1 is used as a raw material, and mixed with a commercially available adhesive of polymethyl acrylate (from Hubei Nuona Co., Ltd., CAS: 9003-21-8), a commercially available adhesive of an acrylic acid-acrylate-acrylonitrile copolymer (from Hubei Nona Co., Ltd., CAS: 25686-45-7), a commercially available stabilizer of sodium carboxymethyl cellulose (chemically pure, from Shanghai Changguang Enterprise Development Co., Ltd., CAS: 9004-32-4), and a commercially available wetting agent of polyoxyethylene ether (from Hubei Nona Co., Ltd., CAS: 27252-80-8) at a mass ratio of 85:6:3:3:3 until uniform. Water is added while mixing to form a slurry with a solid content of about 9%. The slurry is applied onto both surfaces of a substrate layer by knife coating, and a wet coating with a thickness of about 30 μm is formed on the two surfaces, respectively. The substrate layer with the wet coating is transferred to an oven, and dried at a temperature of about 80° C. for about 60 minutes to obtain a separator with a coating thickness of about 5 μm.

Figure 8:
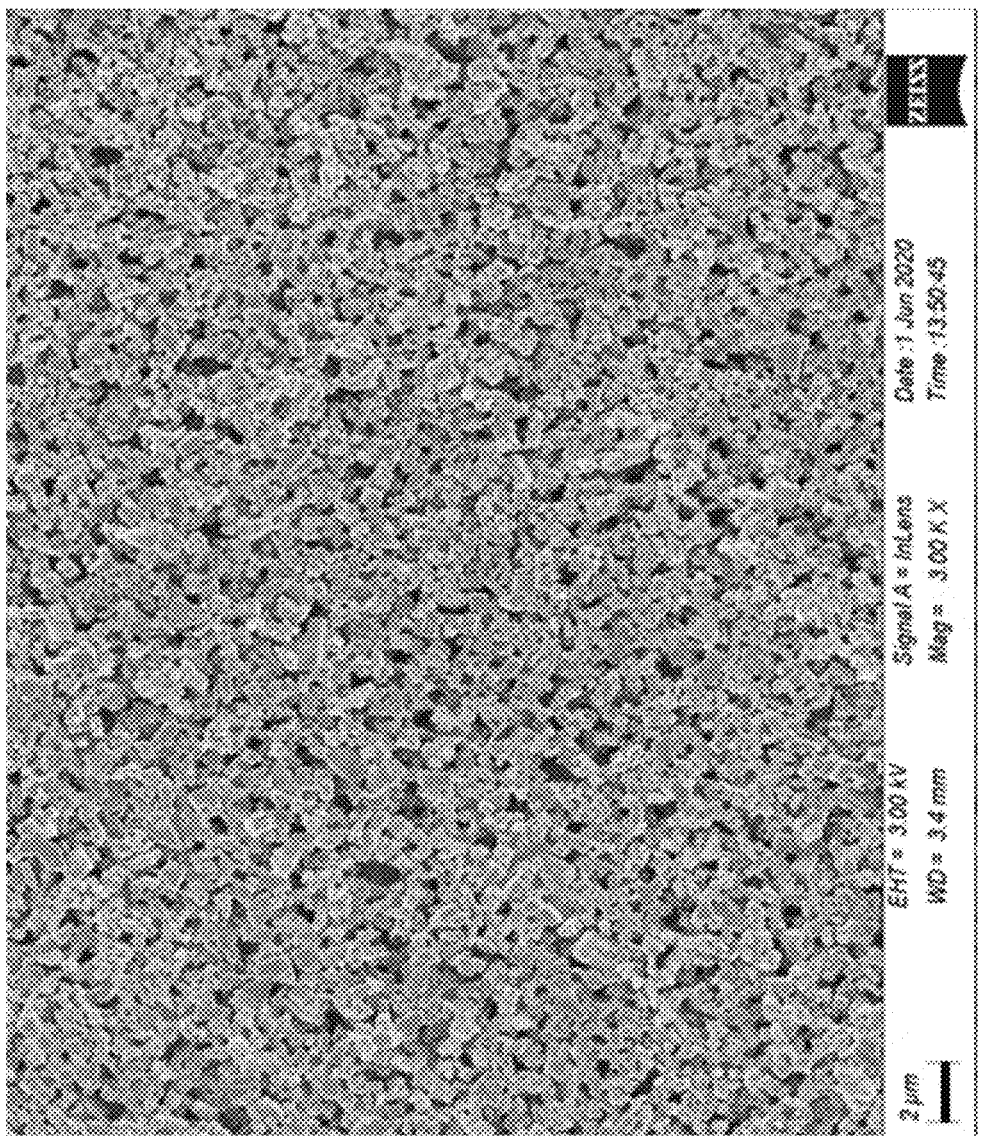
FIG. 8 is an SEM picture of a separator having a coating obtained in example 1.

The obtained separator with a coating is characterized by scanning electron microscopy (SEM) (Sigma300, from Carl-Zeiss Jena GmbH). The obtained SEM picture is shown in FIG. 8.

Examples 2-16 and Comparative Examples 1-7

Separators are prepared in examples 2-16 and comparative examples 1-7 by the method substantially the same as that in example 1, and the difference only lies in that the organic-inorganic hybrid complexs prepared in preparation examples 2-16 and comparative preparation examples 1-7 are used to replace the organic-inorganic hybrid complex used in Example 1, respectively.

Example 17

A coated separator is prepared by the method substantially the same as that in example 1, and the difference only lies in that a certain weight proportion of the organic-inorganic hybrid complex is replaced with commercially available alumina (from Shandong Shuochuang Chemical Technology Co., Ltd.), such that the weight ratio of the organic-inorganic hybrid complex to the alumina is 4: 1.

Examples 18-20

Separators are prepared in examples 18-20 by the method substantially the same as that in example 17, and the difference only lies in that the weight ratio of the organic-inorganic hybrid complex to the alumina in examples 18-20 is 3:2, 2:3 and 1:4, respectively.

Control Example 1

A commercially available microporous PP-PE copolymer film with a thickness of 20 μm and an average pore size of 80 nm (from Zhuogao Electronic Technology Co., Ltd.) is directly used as a separator (a PP-PE bare separator).

Control Example 2

A separator is prepared by the method substantially the same as that in example 1, and the difference only lies in that the organic-inorganic hybrid complex used in example 1 is completely replaced with the same weight of alumina.
Preparation of Cell Application Example 1

An active material of $Na_{0.9}Fe_{0.5}Mn_{0.5}O_2$, a conductive agent of acetylene black (Denka Black, from Denka company limited), and a of binder polyvinylidene fluoride (HSV 900, from Arkema Group) are stirred thoroughly at a weight ratio of 94:3:3 in an N-methylpyrrolidone solvent system for uniform mixing so as to obtain a slurry with a solid content of 30%. Using this slurry, a wet coating having a thickness of 250 μm is formed on one side of an Al foil having a thickness of 12 μm by a transfer coating method. The Al foil with the wet coating is then transferred to an oven, dried at a temperature of 150° C. for 60 minutes, and then cold-pressed with a press of 60 tons using a roller press to obtain a positive electrode plate, wherein the thickness of the dry coating on the side of the Al foil is 130 μm.

An active material of hard carbon, a conductive agent of acetylene black, a binder of a styrene-butadiene rubber, a thickener of sodium carboxymethyl cellulose are stirred thoroughly in a deionized water solvent system at a weight ratio of 95:2:2:1 for uniform mixing so as to obtain a slurry with a solid content of 15%. This slurry is coated onto one side of an Al foil having a thickness of 12 μm by a doctor blade method to form a wet coating having a thickness of 120 μm. The Al foil with the wet coating is then transferred to an oven, dried at a temperature of 150° C. for 60 minutes, and then cold-pressed with a press of 50 tons using a cold press to obtain a negative electrode plate, wherein the thickness of the dry coating on the Al foil is 60 μm.

The positive electrode plate, the separator obtained in example 1 and the negative electrode plate are wound in sequence to form a bare cell having a wound and laminated structure and a size of 16 cm×10 cm×2.8 cm. The bare cell is placed in a steel housing, 150 g of an electrolyte is injected thereto and packaged to obtain a cell. The electrolyte is a 1 M propylene carbonate solution of $NaPF_6$.

Application Examples 2-20, Comparative Application Examples 1-7 and Control Application Examples 1-2

Cells are prepared in application examples 2-20, comparative application examples 1-7 and control application examples 1-2 by the method substantially the same as that in application example 1, and the difference only lies in that the separators of examples 2-20, comparative examples 1-7 and control examples 1-2 are used to replace the separator used in application example 1, respectively.
Performance Test By the following performance test, the separators prepared in examples 1-20, comparative examples 1-7 and control examples 1-2 and the cells prepared in application examples 1-20, comparative application examples 1-7 and control application examples 1-2 are evaluated.

Test Example 1

In this test example, the electrolyte infiltration of each separator is evaluated. Specifically, 1 drop (about 0.05 mL) of a protic hydrophilic electrolyte solution with an electrolyte (1 M ethylene carbonate (EC) solution of $NaPF_6$: ethyl methyl carbonate (EMC)=1/1 W/W solution) is dropped onto a separator placed horizontally. After 5 minutes, the approximate area wetted by the electrolyte solution is recorded by a grid method. Specifically, the measurement method of the grid method is as follows: after 5 minutes, the upper surface of the separator is photographed from directly above, and then a square grid with an area of 0.01 $cm^2$ is used to cover all the areas showing traces of electrolyte solution wetting in the photo, wherein the square grids in the photo which are completely occupied by the traces of electrolyte solution wetting are recorded as "completely wetted", the square grids with an electrolyte solution wetting area equal to or more than half are also recorded as "completely wetted", and the square grids with an electrolyte solution wetting area of less than half are recorded as "not wetted". The electrolyte solution infiltration of the final separator is equal to the number of completely wetted square grids X 0.01, expressed in cm².

Figure 9C:
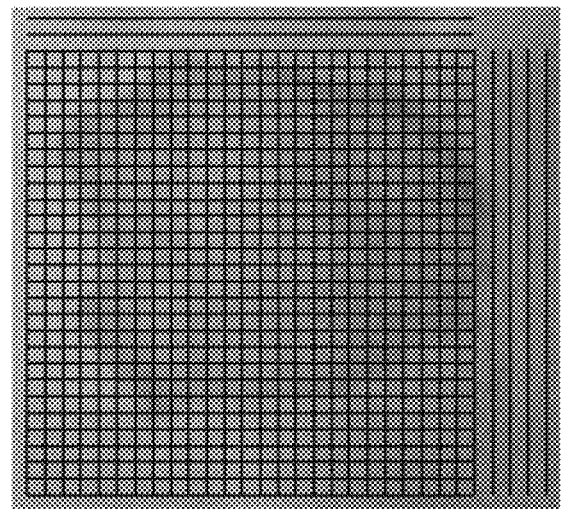
FIGS. 9a, 9b and 9c are infiltration test photos of the separators of control example 1, comparative example 1 and example 1 obtained in test example 1, respectively.
Figure 9B:
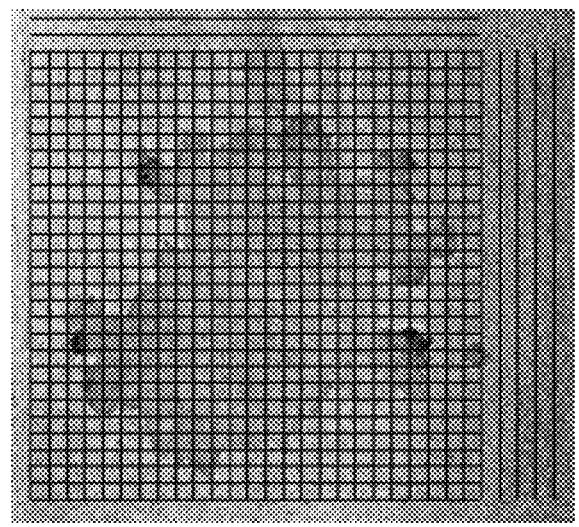
Figure 9A:
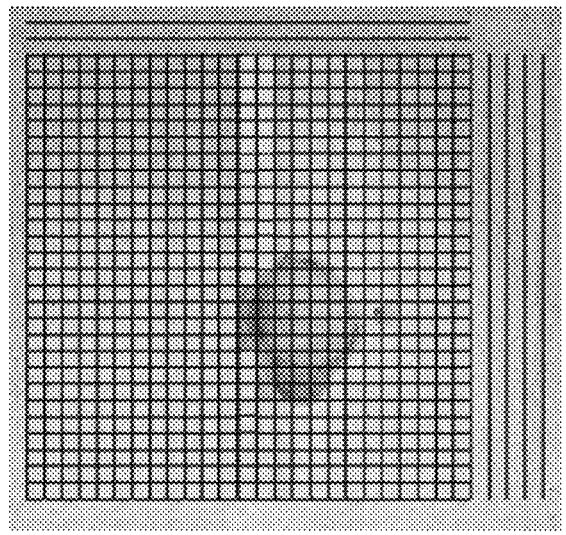

As examples, when the separators of control example 1, comparative example 1 and example 1 are tested for electrolyte solution infiltration, the obtained photos are shown in FIGS. 9a, 9b and 9c, respectively. In FIGS. 9a, 9b and 9c, the numbers of "completely wetted" square grids are 43, 272 and 400, respectively, and it can be concluded therefrom that the electrolyte solution infiltration of the separators of control example 1, comparative example 1 and example 1 are 0.43 cm², 2.72 cm² and 4.00 cm², respectively.

Test Example 2

In this test example, the electrolyte solution retention rate of each separator is evaluated. Specifically, a separator with a size of 10 cm×10 cm×25 μm is taken (there is no coating formed on the surface of the separator of comparative example 1, so its thickness is 20 μm), and the dry weight $W_0$ of the separator is weighed. Then, the separator is immersed in an electrolyte solution for 10 hours, and then left to stand in a sealed container for 1 hour to saturate the electrolyte solution in the separator, and then the wet weight W of the separator is weighed. The electrolyte solution retention rate thereof is calculated based on the following formula:

electrolyte solution retention rate=$[(W-W_0)/W_0] \times 100\%$

It can be seen that the electrolyte solution retention rate thus obtained not only characterizes the capacity of the separator to accommodate an electrolyte solution, but also reflects the capacity of the separator to retain the electrolyte solution.

The evaluation results of test examples 1 and 2 are summarized in Table 1. Table 1 also shows the chemical formulas of the basic units used in respective separators and the defect percentages of the coatings.

TABLE 1

| | basic unit constituting separator coating | defect percentage (%) | electrolyte solution infiltration of separator (cm²) | electrolyte solution retention rate of separator (%) |
|---|---|---|---|---|
| control example 1 | PP-PE bare separator | — | 0.43 | — |
| Control example 2 | $Al_2O_3$ | — | 0.76 | 138 |
| Comparative example 1 | $(CN)_3Fe \cdot Na$ | 0 | 2.72 | 198 |
| Comparative example 2 | $[(CN)_{2.985\square 0.015}]Fe \cdot Na_{0.99}$ | 0.5 | 2.83 | 234 |
| Comparative example 3 | $[(CN)_{1.8\square 1.2}]Fe \cdot Na_{0.1}$ | 40.0 | 0.91 | 223 |
| Comparative example 4 | $(cbIm)_2Co$ | 0 | 0.85 | 273 |
| Comparative example 5 | $(BTC)_2Cu_3 \cdot K$ | 0 | 1.32 | 195 |
| Comparative example 6 | $(BDC)[Fe(OH)_{0.8}F_{0.2}] \cdot Li_{0.5}$ | 0 | 1.75 | 185 |
| Comparative example 7 | $(NTB)_2Zn_4O] \cdot Mg_{0.1}$ | 0 | 1.36 | 171 |
| Example 1 | $[(CN)_{2.79\square 0.21}]Fe \cdot Na_{0.76}$ | 7.0 | 4.00 | 308 |
| Example 2 | $[(CN)_{2.97\square 0.03}]Fe \cdot Na_{0.95}$ | 1.0 | 3.36 | 260 |
| Example 3 | $[(CN)_{2.925\square 0.075}]Fe \cdot Na_{0.90}$ | 2.5 | 3.75 | 296 |
| Example 4 | $[(CN)_{2.46\square 0.54}]Fe \cdot Na_{0.42}$ | 18.0 | 3.81 | 300 |
| Example 5 | $[(CN)_{2.25\square 0.75}]Fe \cdot Na_{0.2}$ | 25.0 | 3.42 | 267 |
| Example 6 | $[(CN)_{2.79\square 0.21}]Mn \cdot Na_{0.76}$ | 7.0 | 3.94 | 304 |
| Example 7 | $[(CN)_{2.79\square 0.21}]Co \cdot Na_{0.76}$ | 7.0 | 4.13 | 312 |
| Example 8 | $[(CN)_{2.79\square 0.21}][Fe_{0.5}Mn_{0.5}] \cdot Na_{0.76}$ | 7.0 | 4.00 | 308 |
| Example 9 | $[(cbIm)_{1.86\square 0.14}]Co$ | 7.0 | 3.89 | 335 |
| Example 10 | $[(cbIm)_{1.98\square 0.02}]Co$ | 1.0 | 3.27 | 302 |
| Example 11 | $[(cbIm)_{1.95\square 0.05}]Co$ | 2.5 | 3.74 | 331 |
| Example 12 | $[(cbIm)_{1.64\square 0.36}]Co$ | 18.0 | 3.62 | 324 |
| Example 13 | $[(cbIm)_{1.50\square 0.5}]Co$ | 25.0 | 3.36 | 309 |
| Example 14 | $[(BTC)_{1.86\square 0.14}]Cu_3 \cdot K$ | 7.0 | 4.10 | 288 |
| Example 15 | $[(BDC)_{0.93\square 0.07}][Fe(OH)_{0.8}F_{0.2}] \cdot Li_{0.5}$ | 7.0 | 3.97 | 276 |
| Example 16 | $[(NTB)_{1.86\square 0.14}][Zn_4O] \cdot Mg_{0.1}$ | 7.0 | 3.90 | 271 |
| Example 17 | 80% $[(CN)_{2.79\square 0.21}]Fe \cdot Na_{0.76}$ + 20% $Al_2O_3$ | 7.0 | 4.12 | 310 |
| Example 18 | 60% $[(CN)_{2.79\square 0.21}]Fe \cdot Na_{0.76}$ + 40% $Al_2O_3$ | 7.0 | 4.12 | 317 |
| Example 19 | 40% $[(CN)_{2.79\square 0.21}]Fe \cdot Na_{0.76}$ + 60% $Al_2O_3$ | 7.0 | 3.78 | 284 |
| Example 20 | 20% $[(CN)_{2.79\square 0.21}]Fe \cdot Na_{0.76}$ + 80% $Al_2O_3$ | 7.0 | 3.39 | 212 |

Test Example 3

In this test example, the electrosolution injection time of each cell is evaluated. Specifically, an electrolyte solution is injected into the cell through vacuum solution injection, and the time required for the electrolyte solution to be fully transferred from a discrete state to the inside of the separator, and then to the inside of the positive and negative electrode plates so as to completely wet the cell, with the premise that the obtained cell is required to have normal performance (there is no performance diving phenomenon caused by insufficient electrolyte solution within 100 cycles).

Test Example 4

In this test example, the rate performance of each cell is evaluated. Specifically, a cell is placed in the test channel of the Arbin electrochemical workstation, charged at a constant current rate of 0.1 C to an end-of-charge voltage of 4 V, and then charged at a constant voltage for 30 minutes, and then discharged at constant current rates of 0.1 C and 1 C, respectively, to an end-of-discharge voltage of 2.5 V, wherein the discharge capacities are recorded as 0.1 C capacity and 1 C capacity, respectively. The rate performance is calculated based on the following formula:

rate performance=1 C capacity/0.1 C capacity× 100%.

Test Example 5

In this test example, the cycling performance of each cell is evaluated. Specifically, a cell is placed in the test channel of the Arbin electrochemical workstation, charged at a constant current rate of 1 C to an end-of-charge voltage of 4 V, let to stand for 5 minutes, and then discharged at a constant current rate of 1 C to an end-of-discharge voltage of 2.5 V, wherein the discharge capacity is recorded, then let to stand for 5 minutes, and this cycle is repeated 100 times. The cycling performance is calculated based on the following formula:

cycling performance=100th cycling capacity/st cycling capacity×1000.

Figure 10:
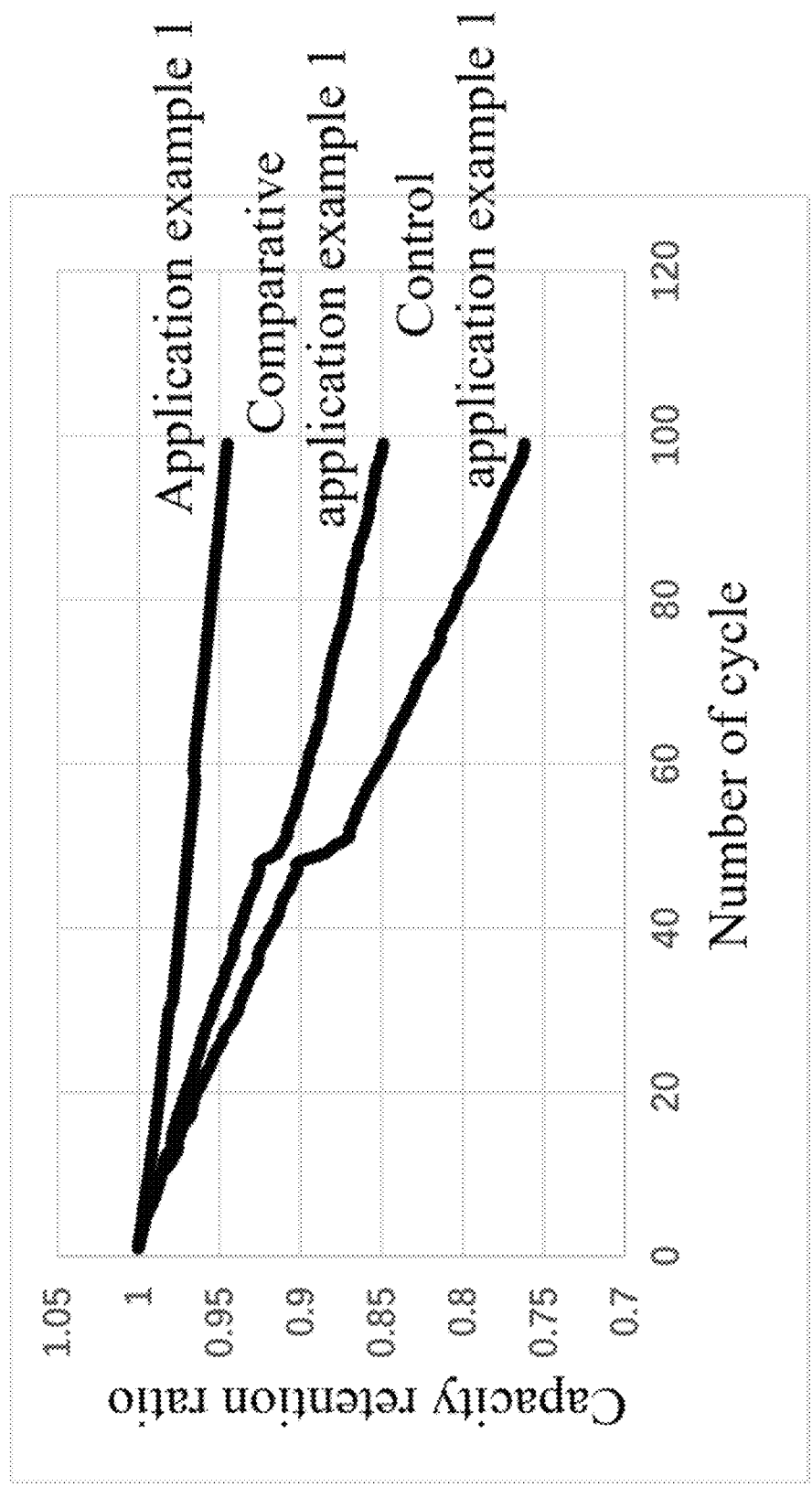
FIG. 10 is a graph of the cycling performance of the cells of control application example 1, comparative application example 1 and application example 1 obtained in test example 5.

As examples, a graph of the cycling performance of the cells of control application example 1, comparative application example 1 and application example 1 is shown in FIG. 10.

The evaluation results of test examples 3-5 are summarized in Table 2. Table 2 also shows the chemical formulas of the basic units used in respective separators and the defect percentage of the coatings.

TABLE 2

| | basic unit constituting separator coating | defect percentage (%) | solution injection time of cell (min) | rate performance (%) | cycling performance (%) |
|---|---|---|---|---|---|
| control application example 1 | PP-PE bare separator | — | 200 | 84 | 76 |
| control application example 2 | $Al_2O_3$ | — | 240 | 88 | 82 |
| comparative application example 1 | $(CN)_3Fe \cdot Na$ | 0 | 180 | 90 | 85 |
| comparative application example 2 | $[(CN)_{2.985 \square 0.015}]Fe \cdot Na_{0.99}$ | 0.5 | 170 | 91 | 86 |
| comparative application example 3 | $[(CN)_{1.8 \square 1.2}]Fe \cdot Na_{0.1}$ | 40.0 | 170 | 92 | 85 |
| comparative application example 4 | $(cbIm)_2Co$ | 0 | 140 | 89 | 83 |
| comparative application example 5 | $(BTC)_2Cu_3 \cdot K$ | 0 | 160 | 77 | 83 |
| comparative application example 6 | $(BDC)[Fe(OH)_{0.8}F_{0.2}] \cdot Li_{0.5}$ | 0 | 150 | 80 | 81 |
| comparative application example 7 | $(NTB)_2Zn_4O] \cdot Mg_{0.1}$ | 0 | 170 | 82 | 84 |
| Application example 1 | $[(CN)_{2.79 \square 0.21}]Fe \cdot Na_{0.76}$ | 7.0 | 90 | 96 | 95 |
| application example 2 | $[(CN)_{2.97 \square 0.03}]Fe \cdot Na_{0.95}$ | 1.0 | 140 | 93 | 89 |
| application example 3 | $[(CN)_{2.925 \square 0.075}]Fe \cdot Na_{0.90}$ | 2.5 | 110 | 95 | 93 |
| application example 4 | $[(CN)_{2.46 \square 0.54}]Fe \cdot Na_{0.42}$ | 18.0 | 110 | 94 | 92 |
| application example 5 | $[(CN)_{2.25 \square 0.75}]Fe \cdot Na_{0.2}$ | 25.0 | 140 | 93 | 87 |
| application example 6 | $[(CN)_{2.79 \square 0.21}]Mn \cdot Na_{0.76}$ | 7.0 | 90 | 96 | 95 |
| application example 7 | $[(CN)_{2.79 \square 0.21}]Co \cdot Na_{0.76}$ | 7.0 | 90 | 96 | 95 |

TABLE 2-continued

|  | basic unit constituting separator coating | defect percentage (%) | solution injection time of cell (min) | rate performance (%) | cycling performance (%) |
|---|---|---|---|---|---|
| application example 8 | $[(CN)_{2.79\square0.21}][Fe_{0.5}Mn_{0.5}]\bullet Na_{0.76}$ | 7.0 | 90 | 96 | 95 |
| application example 9 | $[(cbIm)_{1.86\square0.14}]Co$ | 7.0 | 90 | 95 | 93 |
| application example 10 | $[(cbIm)_{1.98\square0.02}]Co$ | 1.0 | 110 | 92 | 87 |
| application example 11 | $[(cbIm)_{1.95\square0.05}]Co$ | 2.5 | 100 | 94 | 91 |
| application example 12 | $[(cbIm)_{1.64\square0.36}]Co$ | 18.0 | 100 | 94 | 90 |
| application example 13 | $[(cbIm)_{1.50\square0.5}]Co$ | 25.0 | 110 | 92 | 86 |
| application example 14 | $[(BTC)_{1.86\square0.14}]Cu_3\bullet K$ | 7.0 | 100 | 87 | 90 |
| application example 15 | $[(BDC)_{0.93\square0.07}][Fe(OH)_{0.8}F_{0.2}]\bullet Li_{0.5}$ | 7.0 | 110 | 92 | 89 |
| application example 16 | $[(NTB)_{1.86\square0.14}][Zn_4O]\bullet Mg_{0.1}$ | 7.0 | 110 | 93 | 94 |
| Example 17 | 80% $[(CN)_{2.79\square0.21}]Fe\bullet Na_{0.76}$ + 20% $Al_2O_3$ | 7.0 | 90 | 97 | 97 |
| Example 18 | 60% $[(CN)_{2.79\square0.21}]Fe\bullet Na_{0.76}$ + 40% $Al_2O_3$ | 7.0 | 90 | 98 | 98 |
| Example 19 | 40% $[(CN)_{2.79\square0.21}]Fe\bullet Na_{0.76}$ + 60% $Al_2O_3$ | 7.0 | 100 | 95 | 92 |
| Example 20 | 20% $[(CN)_{2.79\square0.21}]Fe\bullet Na_{0.76}$ + 80% $Al_2O_3$ | 7.0 | 160 | 92 | 88 |

As can be seen from the results of the above tests, the results shown in Table 1 show that compared with the bare separator without coating in control example 1 and the separator with an alumina coating in control example 2, the performances of the separators in comparative examples 1-7 and examples 1-20 are improved in terms of both electrolyte solution infiltration and electrolyte solution retention rate. However, the performance improvement of the separator is limited in comparative examples 1-7. Correspondingly, the results shown in Table 2 show that the cells of comparative application examples 1-7 including these separators, respectively, have limited improvements in terms of solution injection time, rate performance, and cycling performance of cells.

Compared with this, in examples 1-20, the defective organic-inorganic hybrid complex of the present application is used in a coating, and the performances of the separator with the coating are further significantly improved in terms of electrolyte solution infiltration and electrolyte solution retention rate. Correspondingly, the cells of application examples 1-20 including these separators, respectively, have further significant improvements in terms of solution injection time, rate performance, and cycling performance of cells.

In examples 1-16, ligand defects within defect percentage ranges specified in the present application are introduced to several exemplary organic-inorganic hybrid complexes included in the separator coating.

The results shown in Table 1 show that the separators of examples 1 to 5 have significantly better electrolyte solution infiltration and electrolyte solution retention rate than comparative example 1 using a defect-free organic-inorganic hybrid complex $(CN)_3Fe.Na$. Correspondingly, the results shown in Table 2 show that the cells of application examples 1-5 including these separators, respectively, are significantly better than that in comparative application example 1 in terms of solution injection time, rate performance, and cycling performance of cells.

Similarly, The results shown in Table 1 show that the separators of examples 9-13 have significantly better electrolyte solution infiltration and electrolyte solution retention rate than comparative example 4 using a defect-free organic-inorganic hybrid complex $(cbIm)_2Co$. Correspondingly, the results shown in Table 2 show that the cells of application examples 9-13 including these separators, respectively, are significantly better than comparative application example 4 in terms of solution injection time, rate performance, and cycling performance of cells.

In addition, the results shown in Table 1 show that the separators of examples 14-16 have significantly better electrolyte solution infiltration and electrolyte solution retention rate than the corresponding defect-free organic-inorganic hybrid complex $(BTC)_2Cu_3.K$, $(BDC)[Fe(OH)_{0.8}F_{0.2}].Li_{0.5}$ and $(NTB)_2[Zn_4O].Mg_{0.1}$ in comparative examples 5-7, respectively. Correspondingly, the results shown in Table 2 show that the cells of application examples 14-16 respectively including these separators, are significantly better than the corresponding comparative application example 5-7 in terms of solution injection time, rate performance, and cycling performance of cells.

It can be seen therefrom that the introduction of ligand defects within the range of defect percentage specified in this application into the organic-inorganic hybrid complex can greatly promote the effects of improvement in the electrolyte solution infiltration of the organic-inorganic hybrid complex as a separator coating material, the improvement in the retention rate of the electrolyte solution, thereby improving the solution injection rate of a cell, as well as the rate performance and cycling performance of the cell. The aforementioned improvements in properties brought about by the introduction of defects into the organic-inorganic hybrid complex can be broadly applied to many different metals and/or ligands.

Especially notably, where the same ligand (CN) and the same metal (Fe) are used, only the defect percentages of introduced defects are different, the results as shown in Table 1 show that compared with the comparative example 2 with a lower defect percentage and comparative example 3 with a higher defect percentage, in examples 1-5, the defect percentage in the organic-inorganic hybrid complex included in the coating of the separator is within 1-30% as defined in this application, and the performance of the separator in terms of electrolyte solution infiltration and electrolyte solution retention rate is significantly better. Correspondingly, the results shown in Table 2 show that the cells of application examples 1-5 including these separators, respectively, are significantly better than those in comparative application examples 2 and 3 in terms of electrolyte injection time, rate performance, and cycling performance of cells.

In examples 17-20, an coating with additional alumina ($Al_2O_3$) is applied on a separator, so that the rate performance and cycling performance of the cell are better while ensuring the wetting characteristics of the separator within a reasonable range. The reason therefor may be that after the organic-inorganic hybrid complex and $Al_2O_3$ are blended, they can be combined more closely due to the complementarity between the particle morphologies. The organic-inorganic hybrid complex plays a role in improving infiltration, improving the electrolyte solution retention rate and increasing the electrolyte injection rate of a cell, while $Al_2O_3$ can provide a rigid and stable separator structure, and these two have a combined effect, and the best combined effect is achieved at a mixing ratio used in example 18.

INDUSTRIAL APPLICABILITY

When the defective organic-inorganic hybrid complex of the present application is applied in a coating of a separator for a secondary battery, the complex improves the electrolyte solution infiltration of the separator while increasing the electrolyte solution retention rate of the separator, thereby reducing polarization and improving the rate capability and cycle life of the secondary batteries. Therefore, the present application is suitable for industrial applications.

What is claimed is:

1. An organic-inorganic hybrid complex, formed from basic units represented by formula (I) being periodically assembled in at least one spatial direction:

 (I)

wherein in the formula (I),

M represents a metal element of the first transition series,

C represents an atom, atomic group, or anion optionally forming a metal cluster with M, L represents an organic bridging ligand forming a coordination bond with the metal M or metal cluster $M_aC_b$, ☐ represents a ligand defect, A represents an atom or cation capable of being intercalated and de-intercalated, x is a number of 1-4, more optionally a number of 1-3, a is a number of greater than 0 and less than or equal to 4, more optionally a number of 1-4, z is a number of 0-2, more optionally a number of 0-1, 0<i<x, and 0≤b:a≤1, wherein the defect level of the organic-inorganic hybrid complex is expressed in a defect percentage, i/x*100%, which is 1% to 30%.

2. The organic-inorganic hybrid complex according to claim 1, wherein the defect percentage is 2% to 20%, optionally 2.5%-18%, and more optionally 5%-10%.

3. The organic-inorganic hybrid complex according to claim 1, wherein ½≤x:a≤3.

4. The organic-inorganic hybrid complex according to claim 1, wherein ¼≤b:a≤1.

5. The organic-inorganic hybrid complex according to claim 1, wherein the C is selected from one or more of —O—, ═O, $O^{2-}$, $S^{-2}$, $F^-$, $Cl^-$, $Br^-$, $I^-$, CO, —OH and $OH^-$, and more optionally selected from —O— or —OH.

6. The organic-inorganic hybrid complex according to claim 1, wherein the L is selected from at least one of cyano, benzimidazole ligands, porphyrin ligands, pyridine ligands, pyrazole ligands, pyrimidine ligands, piperidine ligands, pyrrolidine ligands, furan ligands, thiophene ligands, pyrazine ligands, piperazine ligands, pyridazine ligands, triazine ligands, tetrazine ligands, indole ligands, quinoline ligands, carbazole ligands, morpholine ligands and polycarboxylic acid ligands, wherein one or more of the hydrogen atoms in the L are optionally substituted by one or more substituents, each of which is independently selected from at least one of cyano, nitro, amino, an aldehyde group, carboxyl, a halogen, C1-C6 alkyl, CT-C6 hydroxyalkyl, C1-C6 alkoxy, C2-C6 alkenyl, C2-C6 alkynyl, C3-C8 cycloalkyl, C6-C10 aryl, C6-C10 heteroaryl and any combination thereof; optionally, the L is selected from at least one of cyano, benzimidazole ligands and polycarboxylic acid ligands; more optionally, the L is selected from at least one of cyano, benzimidazole ligands, trimesic acid ligands and terephthalic acid ligands; and more optionally, the L is selected from at least one of cyano, a 5-chlorobenzimidazole ligand (cbIm), a trimesic acid ligand (BTC), a terephthalic acid ligand (BDC) and a tris(2-benzimidazolylmethyl)amine ligand (NTB).

7. The organic-inorganic hybrid complex according to claim 1, wherein the A is an atom or cation of one or more metal elements selected from Li, Na, K, Rb, Cs, Sr, Zn, Mg and Ca, more optionally Li or Na.

8. The organic-inorganic hybrid complex according to claim 1, wherein the basic units represented by formula (I) are periodically assembled in at least one of three spatial directions X', Y' and Z', wherein the three spatial directions X', Y' and Z' in each case form an angle of 0-75 degree, optionally 5-60 degree, with X, Y and Z directions in the cartesian coordinate system.

9. The organic-inorganic hybrid complex according to claim 8, wherein the basic units represented by formula (I) are periodically assembled in at least one spatial direction of the X, Y and Z directions in the cartesian coordinate system.

10. The organic-inorganic hybrid complex according to claim 1, wherein the number of the basic units represented by formula (I) that are periodically assembled in at least one spatial direction is 3 to 10,000.

11. A coating composition, wherein the coating composition comprises the organic-inorganic hybrid complex according to claim 1.

12. The coating composition according to claim 11, wherein the content of the organic-inorganic hybrid complex is 12 wt % to 90 wt %, optionally 17 wt % to 85 wt %, more optionally 34 wt % to 68 wt %, based on the mass of the coating composition.

13. The coating composition according to claim 11, wherein the coating composition further comprises inorganic particles.

14. The coating composition according to claim 13, wherein the mass percentage of the organic-inorganic hybrid complex is 15 wt % to 85 wt %, optionally 20 wt % to 80 wt %, more optionally 40 wt % to 80 wt %, based on the total mass of the organic-inorganic hybrid complex and the inorganic particles in the coating composition.

15. The coating composition according to claim 13, wherein the inorganic particles are selected from at least one of zeolite, molecular sieves, alumina, aluminum oxyhydroxide, silica, aluminum nitride, silicon carbide, magnesia, calcium oxide, zinc oxide, zirconia, titanium oxide and mixtures thereof.

16. A separator for a secondary battery, comprising:
a polymer substrate layer; and
a coating coated onto the polymer substrate layer, wherein the coating comprises the organic-inorganic hybrid complex according to claim 1.

17. A secondary battery, comprising:
a positive electrode;
a negative electrode;
an electrolyte; and
the separator according to claim 16.

18. A battery module, comprising the secondary battery according to claim 17.

19. A battery pack, comprising the battery module according to claim 18.

* * * * *